United States Patent
Ito et al.

(10) Patent No.: US 8,265,687 B2
(45) Date of Patent: Sep. 11, 2012

(54) ELECTRONIC APPARATUS AND CONTROL METHOD OF SAME

(75) Inventors: Kazuto Ito, Kanagawa (JP); Yasuhiro Ueno, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 596 days.

(21) Appl. No.: 12/295,567

(22) PCT Filed: Mar. 29, 2007

(86) PCT No.: PCT/JP2007/056832
§ 371 (c)(1),
(2), (4) Date: Sep. 11, 2009

(87) PCT Pub. No.: WO2007/114234
PCT Pub. Date: Oct. 11, 2007

(65) Prior Publication Data
US 2010/0234062 A1    Sep. 16, 2010

(30) Foreign Application Priority Data
Mar. 30, 2006 (JP) ................................ 2006-096092
Apr. 27, 2006 (JP) ................................ 2006-124492

(51) Int. Cl.
*H04W 88/02* (2009.01)
(52) U.S. Cl. .................. 455/550.1; 343/754; 340/572.7
(58) Field of Classification Search .................. 455/550, 455/73, 550.1
See application file for complete search history.

(56) References Cited

U.S. PATENT DOCUMENTS
2006/0001585 A1* 1/2006 Saito et al. .................... 343/754

FOREIGN PATENT DOCUMENTS

| JP | 2003-016398 A | | 1/2003 |
| JP | 2003015398 A | | 1/2003 |
| JP | 2005-107324 A | | 4/2005 |
| JP | 2005-167658 A | | 6/2005 |
| JP | 2005244868 A | * | 9/2005 |
| JP | 2005-291936 A | | 10/2005 |
| JP | 2006-005540 A | | 1/2006 |
| WO | 2005/003683 A1 | | 1/2005 |

OTHER PUBLICATIONS

JP 2005244868, machine translation in English.*
JP 2003-16398, machine translation in English.*
English translation of Korean Office Action dated Jul. 29, 2010 for corresponding Korean Application No. 10-2008-7026536.
Japanese language office action dated Jan. 25, 2011 and its English language translation for corresponding Japanese application 2006096092 lists the reference above. Chinese language office action dated Dec. 21, 2010 and its English language translation for corresponding Chinese application 200780012305.2.
Japanese language office action dated Mar. 15, 2011 and its English language translation for corresponding Japanese application 2006124492.

* cited by examiner

*Primary Examiner* — Jinsong Hu
*Assistant Examiner* — Jean Chang
(74) *Attorney, Agent, or Firm* — DLA Piper LLP (US)

(57) ABSTRACT

A mobile phone or other electronic apparatus capable of displaying a bearing and non-contact communication using electromagnetic waves wherein when detection processing of geomagnetism by a geomagnetism sensor and non-contact communication processing using electromagnetic waves are carried out at the same timing, measures are taken since there is a possibility that the geomagnetism detected by the geomagnetism sensor is not correct due to the influence of the electromagnetic waves. Further, when the detection processing of the geomagnetism by the geomagnetism sensor and the non-contact communication processing using electromagnetic waves are carried out at the same timing, bearing processing based on a detection signal of the geomagnetism sensor is restricted or the non-contact communication processing is restricted.

19 Claims, 12 Drawing Sheets

ELECTRONIC APPARATUS AND CONTROL METHOD OF SAME

TECHNICAL FIELD

The present invention relates to, for example, an electronic apparatus providing a magnetism sensor in a mobile phone apparatus to detect geomagnetism data, announcing bearing information calculated from the geomagnetism data, and capable of non-contact communication using electromagnetic waves and a control method of the same.

The present invention particularly relates to a technique restricting bearing processing or restricting non-contact communication processing when the bearing processing and the non-contact communication processing using the geomagnetism sensor are simultaneously executed and compete.

BACKGROUND ART

Patent Document 1 discloses an electronic compass (bearing display) technique providing a geomagnetism sensor in a portable apparatus, announcing a current bearing of the portable apparatus from a detection signal of the geomagnetism sensor, and announcing GPS or other position information to enable navigation.

Patent Document 2 discloses a technique performing communication by a non-contact system with a reader/writer using electromagnetic waves and performing transactions and other non-contact communication processing.

Further, a mobile phone apparatus performing, in addition to the functions of a phone of a speech function and mail function, the two functions explained above, that is, electronic compass processing and transaction processing or other non-contact communication is known.

When using such a mobile phone apparatus, a single mobile phone apparatus enables speech or mail, the electronic compass, and transactions and other non-contact communication, so this is very convenient. For example, speech or mail can be carried out while using the electronic compass function. Alternatively, for example, transaction processing by the non-contact communication using electromagnetic waves while using the electronic compass function is possible when bringing the mobile phone apparatus close to an access portion of an automatic fare charging machine using a non-contact IC card function disposed at a ticket gate of a train station so as to use the automatic fare charging system.

Patent Document 1: Japanese Patent Publication (A) No. 2005-107324
Patent Document 2: Japanese Patent Publication (A) No. 2005-167658

DISCLOSURE OF INVENTION

Technical Problem

The geomagnetism sensor used for the bearing display of an electronic compass detects geomagnetism in response to very weak geomagnetism. If the geomagnetism sensor is located, for example, in an effective region of electromagnetic waves of a reader/writer at an access portion of an automatic fare charging system using a non-contact IC card function, that is, if the mobile phone apparatus mounting the geomagnetism sensor is run over the reader/writer, the geomagnetism sensor will sense a magnetism stronger than the geomagnetism caused by the electromagnetic waves emitted from the reader/writer, so the correct geomagnetism will not be able to be detected. As a result of that, there is a possibility that the announcement of the bearing information by the electronic compass will not be correct.

As an example of non-contact communications, transaction processing in an automatic fare charging system using a non-contact IC card function was illustrated, but the non-contact communication is not limited to transaction processing. A similar problem to that described above occurs even in a case where communication processing is carried out by a non-contact method using electromagnetic waves together with a non-contact communication apparatus such as a reader/writer emitting electromagnetic waves.

From the above viewpoint, when non-contact communication using electromagnetic waves is carried out, if there is the possibility that the geomagnetism detected by the geomagnetism sensor will not be correct, restriction of the bearing processing or restriction of the non-contact communication has been demanded.

Further, there also exists a possibility that a user will unintentionally or intentionally start non-contact communication when the bearing processing is being carried out by bringing the electronic apparatus close to a reader/writer or other source of electromagnetic waves and thereby throw off the detection of the geomagnetism by the geomagnetism sensor. Therefore, it has been demanded to enable announcement of such a state as well.

Technical Solution

According to the present invention, there is provided an electronic apparatus having a geomagnetism sensor detecting geomagnetism, a bearing calculation part configured to calculate a geographical bearing based on a detection value of the geomagnetism sensor, a bearing an information announcing part configured to announce information concerning the bearing calculated based on the detection value of the geomagnetism sensor, a non-contact communication part configured to perform communication by a non-contact method using electromagnetic waves, and a restriction part configured to restrict either of the non-contact communication by the non-contact communication part or the bearing processing by at least one of the bearing calculation part and the bearing information announcing part in a case where the non-contact communication using electromagnetic waves by the non-contact communication part and the bearing processing by at least one of the bearing calculation part and the bearing information announcing part are simultaneously executed.

Preferably, the restriction part restricts the bearing processing.

More preferably, the electronic apparatus further has a display, and the bearing information announcing part, as the bearing processing, displays the information concerning the bearing at the display.

Preferably, the restriction part, as the restriction of the bearing processing, displays the information concerning the bearing as fixed information.

More preferably, the restriction part, as the restriction of the bearing processing, changes a display format of the information concerning the bearing at the display.

More preferably, the restriction part, as the restriction of the bearing processing, erases the information concerning the announcement by the bearing information announcing part.

More preferably, the restriction part releases the restriction of the bearing processing when the non-contact communication in the non-contact communication part ends.

Preferably, the restriction part restricts the non-contact communication.

More preferably, the electronic apparatus further has a display, the bearing information announcing part, as the bearing processing, displays the information concerning the bearing at the display, and the restriction part, when restricting the non-contact communication, announces information indicating that the non-contact communication is restricted by changing the display format of the information concerning the bearing displayed at the display.

More preferably, the restriction part announces information indicating an existence of a possibility that the announcement of the bearing information by the bearing information announcing part is not correct due to the non-contact communication.

Preferably, the electronic apparatus further has a display, the bearing information announcing part, as the bearing processing, displays the information concerning the bearing at the display, and the restriction part, as the information indicating an existence of the possibility that the announcement of the bearing information by the bearing information announcing part is not correct due to the non-contact communication, changes the display format of the information concerning the bearing displayed at the display.

Preferably, the restriction part announces that either of the non-contact communication or the bearing processing has been restricted.

Preferably, the restriction part has an audio output portion and outputs an audio information indicating that either of the non-contact communication or the bearing processing was restricted via the audio output portion.

Further, according to the present invention, there is provided a control method of an electronic apparatus, comprising a bearing calculation step of calculating a geographical bearing based on a detection value of a geomagnetism sensor, a bearing information announcement step of announcing an information concerning the calculated bearing, a non-contact communication step of performing non-contact communication using electromagnetic waves, and a restriction step of restricting either of the non-contact communication or the bearing processing in the case where the non-contact communication in the non-contact communication step and the bearing processing in at least one of the bearing calculation step and the bearing information announcement step are simultaneously executed.

Preferably, the restriction step performs processing restricting the bearing processing or performs processing restricting the non-contact communication.

More preferably, the restriction step performs processing releasing the restriction of the bearing processing when the non-contact communication ends.

ADVANTAGEOUS EFFECTS

According to the present invention, in the case where non-contact communication using electromagnetic waves and bearing processing based on the detection value of the geomagnetism sensor are simultaneously executed, if the electronic apparatus is placed in an electromagnetic wave environment accompanied with non-contact communication using electromagnetic waves and the geomagnetism sensor is liable to be affected the magnetic field caused by the electromagnetic waves and not be able to detect the correct geomagnetism, for example, the bearing processing is restricted to avoid the announcement of erroneous bearing information to the user.

Further, according to the present invention, in the case where at least one processing of the bearing calculation processing and bearing information announcement processing and the non-contact communication processing are simultaneously executed, for example, the non-contact communication is restricted to enable the bearing processing to be continuously carried out.

These and other features of the present invention will become clearer from the following description given with reference to the accompanying drawings.

Figure 1A:
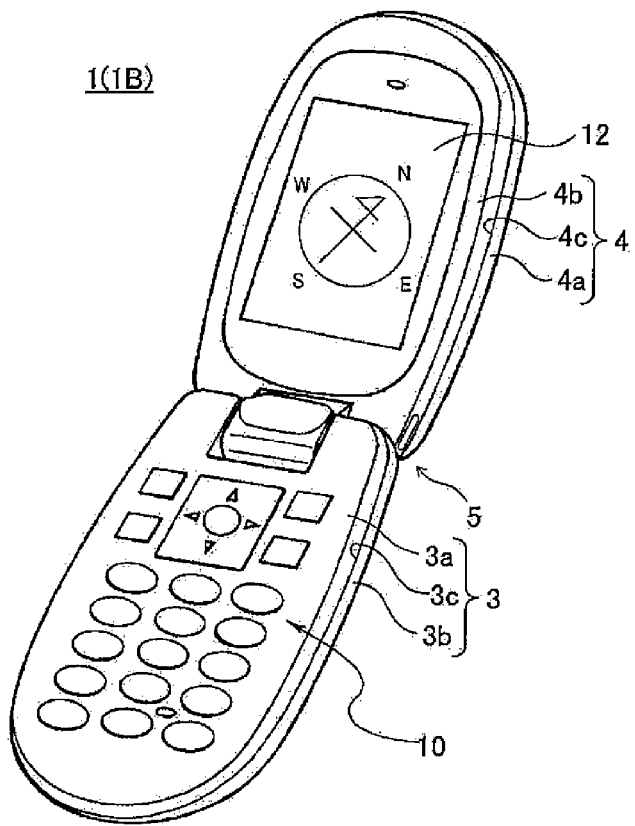
FIGS. 1A and 1B are a perspective view of the appearance and a cross-sectional view of the appearance of a flip-open type mobile phone of embodiments of a first aspect and a second aspect of an electronic apparatus of the present invention.

EXPLANATION OF REFERENCES 1, 1B, 1C . . . flip-open type mobile phones, 1A . . . straight type mobile phone
3 . . . first housing,
3a . . . first housing top, 3b . . . first housing bottom, 3c . . . first housing divided portion
4 . . . second housing,
4a . . . second housing top, 4b . . . second housing bottom, 4c . . . second housing divided portion
5 . . . connection portion 10, 10A ... key input portions, 12, 12A ... displays
100, 100a, 100A, 100Aa, 100B ... signal processing parts
101 ... wireless communication portion, 102 ... GPS signal receiver,
103 ... transaction (TR) communication portion
104 ... audio processing portion, 105 ... speaker, 106 ... microphone
109 ... memory, 110 ... power switch, 111 ... battery
121 ... wireless communication antenna, 122 ... GPS antenna,
123 ... transaction antenna
150, 150a, 150A, 150Aa ... signal processors
152 ... general processing part, 154 ... bearing calculation part, 156 ... bearing information announcing part, 158 ... bearing announcement suppressing part, 160 ... housing open/closed processing part, 162 ... transaction (TR) processing part 168 ... transaction processing restriction part
170 ... geomagnetism sensor,
180 ... magnetic force sensor,
190 ... magnet
200 ... reader/writer

BEST MODE FOR CARRYING OUT THE INVENTION

Preferred embodiments of an electronic apparatus of the present invention having the bearing calculation function, announcement function, and non-contact communication function and a control method for the same, will be explained.

Below, as an embodiment of an electronic apparatus having the bearing calculation function, announcement function, and non-contact communication function of the present embodiment, a mobile phone apparatus having, other than the bearing calculation function, announcement function, and non-contact communication function, a speech function and a mail function will be exemplified and explained.

Naturally, the electronic apparatus of the embodiment of the present invention need only have the bearing calculation function, announcement function, and non-contact communication function. The invention is not limited to a mobile phone apparatus having a speech function and a mail function, and includes various other mobile terminals having a bearing calculation function, announcement function and non-contact communication function.

In an embodiment of the electronic apparatus of the present invention, when the bearing processing and the non-contact communication processing are simultaneously executed and compete, the bearing processing is restricted or the non-contact communication processing is restricted.

As an embodiment of a first aspect of the present invention, a case where the bearing processing is restricted when the bearing processing and the non-contact communication processing are simultaneously executed and compete will be explained.

On the other hand, as an embodiment of a second aspect of the present invention, a case where the non-contact communication processing is restricted when the bearing processing and the non-contact communication processing are simultaneously executed and compete will be explained.

Appearance of Embodiment of Present Invention

As an embodiment of the present invention, a flip-open type mobile phone will be exemplified.

First, a case where the appearances of both of the flip-open type mobile phone of the embodiment of the first aspect of the present invention and the flip-open type mobile phone of the embodiment of the second aspect of the present invention are the same, will be exemplified.

Figure 1B:
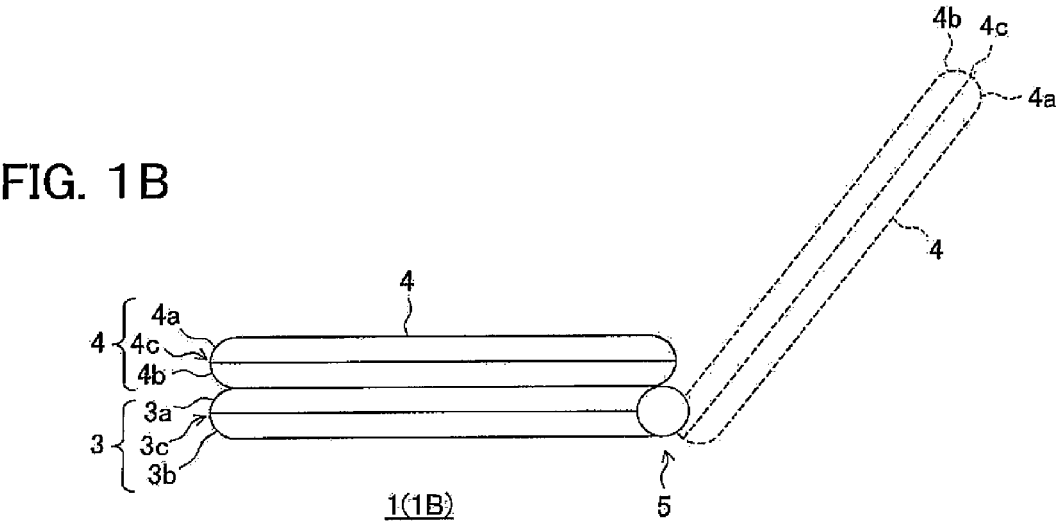

FIGS. 1A and 1B are a perspective view of the appearance and a cross-sectional view of the appearance of a flip-open type mobile phone 1 of the present embodiment.

A flip-open type mobile phone 1 of the embodiment of the first aspect of the present invention and a flip-open type mobile phone 1B of the embodiment of the second aspect of the present invention have the same outer appearance. Hereinafter, these will be referred to overall as the flip-open type mobile phone 1 to explain the appearance and configuration.

The flip-open type mobile phone 1 has a first housing 3, a second housing 4, and a connection portion 5.

The first housing 3 and the second housing 4 are configured so that they can be freely opened/closed so that the first housing 3 and the second housing 4 can take a facing state illustrated by a solid line in FIG. 1B or a separated state illustrated by a broken line in FIG. 1B about the connection portion 5 as the center (pivot axis).

The first housing 3 has a first housing top 3a and a first housing bottom 3b divided by a first housing divided portion 3c. The first housing top 3a and the first housing bottom 3b are connected whereby the first housing 3 is integrally formed.

The second housing 4 has a second housing top 4a and a second housing bottom 4b divided by a second housing divided portion 4c as well. The second housing top 4a and the second housing bottom 4b are connected whereby the second housing 4 is integrally formed.

On the surface of the first housing top 3a, a key input portion 10 having ten-key switches, a function selection button. etc. is arranged.

In the second housing top 4a, as an example of a displaying means of the present invention, for example, a liquid crystal display or other display 12 is arranged.

Figure 2A:
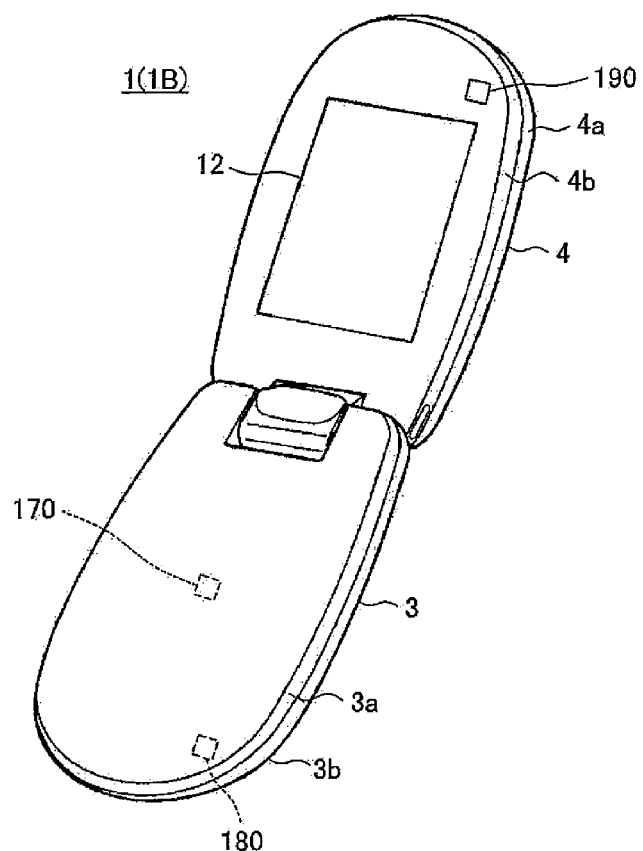
FIGS. 2A and 2B are diagrams showing a first example of arrangement of a geomagnetism sensor, a magnetic force sensor, and a magnet in the flip-open type mobile phone illustrated in FIG. 1.
Figure 2B:
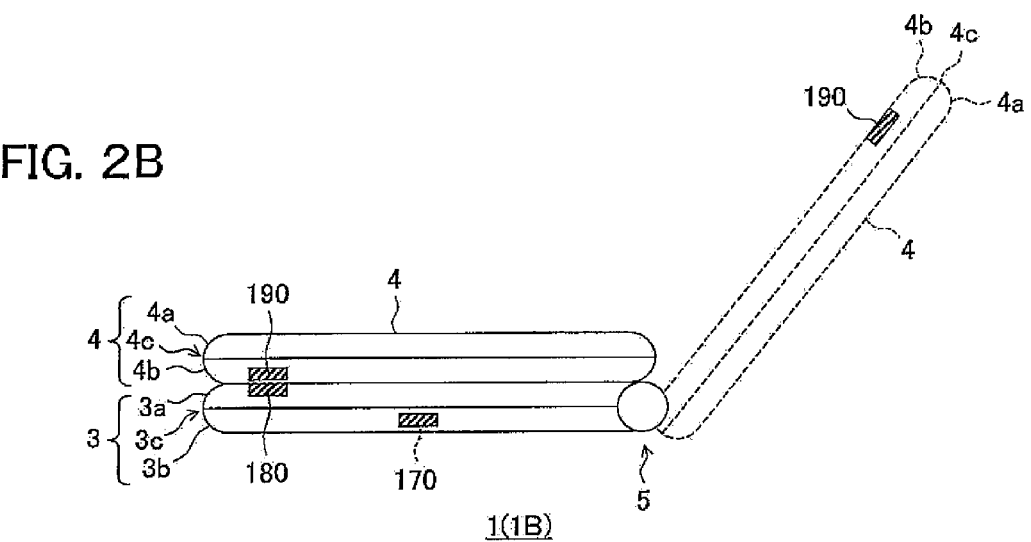

FIGS. 2A and 2B are diagrams showing an example of arrangement of a geomagnetism sensor 170, a magnetic force sensor 180, and a magnet 190 in the flip-open type mobile phone 1 illustrated in FIGS. 1A and 1B. The magnetic force sensor 180 and the magnet 190 are disposed in order to detect an open/closed state of the first housing 3 and the second housing 4.

As illustrated by the solid line of FIG. 2B, when the first housing 3 and the second housing 4 face each other and form the closed state, the magnetic force sensor 180 and the magnet 190 face each other, therefore the magnetic force sensor 180 senses the strong magnetism of the magnet 190.

On the other hand, as shown by the broken line of FIG. 2B, when the first housing 3 and the second housing 4 are separated and form the open state, the magnetic force sensor 180 does not sense the magnetism of the magnet 190.

A housing open/closed detection processing part 160 explained later with reference to FIG. 3 and FIG. 8 judges the open/closed state of the first housing 3 and second housing 4 in accordance with the value of the magnetism detected by the magnetic force sensor 180.

The geomagnetism sensor 170 is desirably disposed at a position not affected much at all by the magnetism from the magnet 190 even in the state where the first housing 3 and second housing 4 face each other and the housing is closed.

Flip-Open Type Mobile Phone of First Aspect of Present Invention

Figure 3:
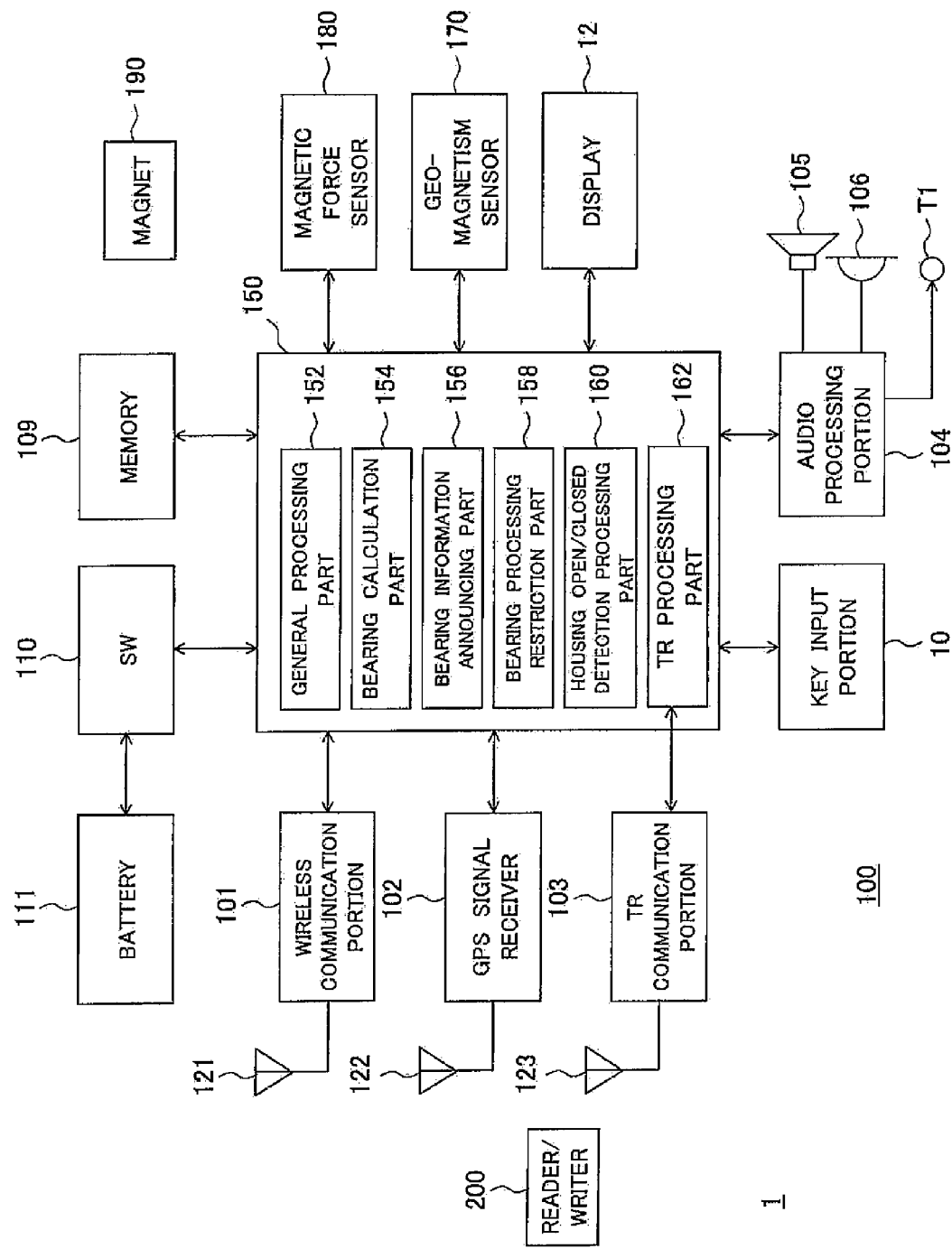
FIG. 3 is a diagram illustrating a portion of the components in a mobile phone which are mounted (arranged) in the flip-open type mobile phone illustrated in FIG. 1 and mainly showing a signal processing part of the embodiment in the first aspect of the present invention.

FIG. 3 is a diagram illustrating portions of the components in the flip-open type mobile phone 1 which are mounted (arranged) in the first housing 3 and second housing 4 and mainly showing a signal processing part 100 as an embodiment of the first aspect of the present invention.

An example of the arrangement of these components will be explained.

In the first housing bottom 3b, a wireless communication portion 101, a GPS signal receiver 102, a transaction (TR) communication portion 103 configuring a portion of the non-contact communicating means of the present invention, an audio processing portion 104, a memory 109, a power switch 110, a battery 111, and a signal processor 150, are arranged (mounted).

In the first housing top 3a, other than the key input portion 10, a microphone 106 connected to the audio processing portion 104 is arranged. Further, in the second housing top 4a, a speaker 105 connected to the audio processing portion 104 is arranged.

Each of the wireless communication antenna 121, GPS antenna 122, and transaction (TR) antenna 123 configuring a portion of the non-contact communicating means of the present invention is arranged at an appropriate location of the first housing bottom 3b or second housing bottom 4b etc.

The magnetic field by the reader/writer 200 used in a non-contact communication system using electromagnetic waves utilizing a non-contact IC card function, for example, FeliCa® and Suica®, is much stronger than the geomagnetism. As a result, when non-contact communication using electromagnetic waves is carried out between the mobile phone 1 and the reader/writer 200, sometimes the geomagnetism sensor 170 detecting the geomagnetism is affected by the magnetic field of the reader/writer 200 and cannot detect the correct geomagnetism.

The TR antenna 123 is used by bringing the mobile phone 1 close to or touching the reader/writer 200 for the FeliCa®, Suica®, or other non-contact communication processing. For example, when using Suica®, the TR antenna 123 mounted in the flip-open type mobile phone 1 is brought close to the access window of the automatic fare charging machine disposed at the ticket gate of the station or the mobile phone 1 is touched against the access window. The reader/writer 200 is accommodated inside the access window and emits electromagnetic waves for the non-contact communication.

As a result, the geomagnetism sensor 170 mounted in the mobile phone 1 is located in the effective region of electromagnetic waves emitted from the reader/writer 200.

In such case, desirably the geomagnetism sensor 170 and the TR antenna 123 are arranged separated in locations so as to prevent the geomagnetism sensor 170 from being influenced by the magnetism due to the electromagnetic waves from the reader/writer 200 as much as possible.

For example, as illustrated in FIG. 1A, in a case where the antenna is brought close to the access portion of the reader/writer 200 in the state where the bearing information is displayed at the display 12 and non-contact communication with the reader/writer 200 is carried out, if the TR antenna 123 is disposed in the top 4a of the second housing 4 (front surface side of the flip-open type mobile phone 1 in the closed state), even in the case where the TR antenna 123 is brought close to the reader/writer 200, the geomagnetism sensor 170 becomes relatively far from the effective region of electromagnetic waves emitted from the reader/writer 200, therefore the geomagnetism sensor 170 is relatively hard to be influenced by the strong magnetism due to the electromagnetic waves emitted from the reader/writer 200.

However, there is always the possibility that the user will bring the mobile phone 1 close to the reader/writer 200 unintentionally or intentionally for non-contact communication resulting in the geomagnetism sensor 170 detecting the erroneous geomagnetism.

The wireless communication antenna 121 is an antenna for transmitting/receiving information, for example, when performing speech or performing the mail processing with a wireless base station using the mobile phone 1.

The wireless communication portion 101 converts a high frequency communication signal of speech information or mail information received via the wireless communication antenna 121 to a baseband zone, and demodulates the baseband signal. The wireless communication portion 101 modulates the baseband zone speech information or mail information, converts the modulated signal to a high frequency communication signal, and outputs the converted signal to the wireless communication antenna 121.

The GPS antenna 122 is an antenna for receiving position information from GPS satellites.

The GPS signal receiver 102 converts a high frequency signal to the baseband zone for a signal received at the GPS antenna 122 and including the position information received from the GPS satellites, and demodulates the converted signal.

The transaction (TR) antenna 123 is an antenna performing non-contact communication using electromagnetic waves with the reader/writer 200 in the Suica® or other non-contact communication system for transmitting/receiving the transaction information.

The TR communication portion 103 converts the high frequency signal emitted as electromagnetic waves from the reader/writer 200 and received at the TR antenna 123 to the baseband zone, demodulates the baseband zone signal, and transmits the result signal to a transaction (TR) processing part 162 explained later forming part of the non-contact communicating means of the present invention. Alternatively, the TR communication portion 103 modulates the result of the processing at the TR processing part 162 in the mobile phone 1 for transmitting it to the reader/writer 200, converts the modulated baseband frequency signal to a high frequency signal, applies the converted signal to the TR antenna 123, and transmits the signal to the reader/writer 200.

The wireless communication antenna 121 and the wireless base station, the GPS antenna 122 and the GPS satellites, and the TR antenna 123 and the reader/writer 200 communicate by signals of different frequency bands in order to prevent interference.

The signal processor 150 is configured by using, for example, a microprocessor (µP), and has a general processing part 152, a bearing calculation part 154, a bearing information announcing part 156, a bearing processing restriction part 158, a housing open/closed detection processing part 160, and a transaction processing part 162.

In the present embodiment, the general processing part 152, the bearing calculation part 154, the bearing information announcing part 156, the bearing processing restriction part 158 of one example of the bearing processing restricting means of the present invention, the housing open/closed detection processing part 160, and the transaction processing part 162 are realized by a program stored in the memory 109 performing the processing explained below in a central processing unit (CPU) in the signal processor 150.

The memory 109, for example, has a program performing the processing described above, a ROM storing status data explained later and fixed parameters etc., and a RAM used for a temporary storage of various data.

A summary of the processing content of the signal processor 150 will be explained next.

The general processing part 152 performs, for example, the following processing based on, for example, an operation instruction of the user from the key input portion 10.

(1) Speech Processing

When the user dials a number via the key input portion 10 to make a call, the general processing part 152 detects the dialing and performs speech processing with the other party of the call destination via the audio processing portion 104, wireless communication portion 101, and wireless communication antenna 121. For example, the audio processing portion 104 processes an audio signal input from a microphone 106, transmits the audio signal to the other party via the wireless communication portion 101, and outputs the audio signal at the other party side via the speaker 105.

The general processing part 152 manages the processing described above and, according to need, displays information connected with the speech at the display 12.

(2) Position Display Processing

When the user requests position display via the key input portion 10, the general processing part 152 detects the request, obtains the position information of the mobile phone 1 from the GPS satellites via the GPS signal receiver 102 and the GPS antenna 122, and displays the result as a graphic in, for example, the display 12.

(3) Other Processing

The general processing part 152, other than the above, for example, manages the remaining power of the battery 111.

Further, the general processing part 152 performs the processing explained below in cooperation with the bearing calculation part 154, bearing information announcing part 156, bearing processing restriction part 158, housing open/closed detection processing part 160, and/or transaction processing part 162.

Open/Closed Detection of First Housing and Second Housing

The housing open/closed detection processing part 160 detects the open/closed state of the first housing 3 and second housing 4.

As explained above, the magnetic force sensor 180 arranged on a back surface or front surface of the first housing top 3a and the magnet 190 arranged at an outer circumference of the display 12 on the back surface or front surface of the second housing bottom 4b are placed at positions that face each other when the first housing 3 and second housing 4 face each other.

When the first housing 3 and second housing 4 face each other, the magnetic force sensor 180 and the magnet 190 substantially face each other, so the magnetic force sensor 180 is affected by the strong magnetic field of the magnet 190. When the magnetic field of the magnet 190 detected by the magnetic force sensor 180 exceeds a predetermined level, the housing open/closed detection processing part 160 detects that the first housing 3 and the second housing 4 are in the closed state where these face or substantially face each other.

On the other hand, when the first housing 3 and the second housing 4 are separated, the influence of the magnetic field of the magnet 190 on the magnetic force sensor 180 is lowered. When the magnetic field of the magnet 190 detected by the magnetic force sensor 180 becomes a predetermined level or less, the housing open/closed detection processing part 160 detects that the first housing 3 and second housing 4 are in the open state where these housings are separated from each other.

The transaction processing (TR processing) explained below can be carried out regardless of the bearing processing.

The geomagnetism sensor 170 is arranged at substantially the center of the first housing bottom 3b. The reason for that arrangement is the prevention of the influence of the magnetic field of the magnet 190 being received as much as possible even at the time when the first housing 3 and the second housing 4 face each other. Namely, the geomagnetism sensor 170 senses even a very small magnetic field, so this is for avoiding the magnet 190 throwing off the bearing.

Bearing Calculation and Announcement of Bearing Information

The bearing calculation part 154 calculates the bearing based on the geomagnetism detection value detected by the geomagnetism sensor 170.

Note that, as the method for calculation of the bearing in the bearing calculation part 154 can be used known one, a detailed explanation thereof is omitted.

The bearing information announcing part 156 announces (displays) the bearing calculation result calculated at the bearing calculation part 154 in cooperation with the general processing part 152, for example, at the display 12, as graphic information as exemplified in FIG. 1A. FIG. 1A shows an example of displaying the bearing pointing north at the display 12.

Transaction Processing

A simple example of the transaction processing will be explained.

"Transaction processing" means various types of transaction processing using the flip-open type mobile phone 1 via the reader/writer 200. For example, its processing means processing for charging for a ticket when using Suica® and processing concerning FeliCa®. Naturally, processing using the reader/writer 200 for banking operations, stock trading, etc. also correspond to transaction processing.

Note that FeliCa® is the non-contact communication system configured so that the money charge processing is carried out when a portable terminal having a built-in non-contact IC card and antenna is approached to the reader/writer, and used in Japan.

Further, Suica® is the non-contact communication system configured so that a riding fee is charged by holding up the portable terminal having a built-in non-contact IC card and antenna over the ticket gate having a built-in reader/writer when getting on/off a vehicle of railroad or subway, and used in Japan. Commodities can be purchased by using Suica® as well.

In the present embodiment, the transaction processing means various types of processing for non-contact communication using electromagnetic waves between the mobile phone 1 and the reader/writer 200 by the non-contact IC function.

For example, when the flip-open type mobile phone 1 is applied to the Suica®, FeliCa®, or other non-contact communication system, the transaction antenna 123 in the flip-open type mobile phone 1 is brought close to the reader/writer 200 in the Suica®, FeliCa®, or other non-contact communication system.

Electromagnetic waves are emitted from the reader/writer 200. When the transaction antenna 123 detects those electromagnetic waves, the transaction communication portion 103, as explained above, transmits a signal included in electromagnetic waves for frequency conversion, demodulation, etc. to the transaction processing part 162.

Below, an outline of the non-contact communication processing between an automatic fare charging machine (having a built-in reader/writer 200) disposed at a ticket gate of a train station and the flip-open type mobile phone 1 when utilizing the Suica® function. Explanation of the communication protocol etc. will be omitted.

An automatic fare charging machine provided with the reader/writer 200 is disposed at the ticket gate of a train station. Electromagnetic waves emitted from the reader/writer 200 are emitted from the access window.

The electromagnetic waves emitted from the reader/writer 200 include, for example, data indicating that Suica® will be used for paying for the train fare, data indicating the name of the train line, data indicating the name of the entering station (the station getting on a train) of that ticket gate, and so on.

The transaction processing part 162 inputs the received signal from the reader/writer 200 via the transaction antenna 123 and the transaction communication portion 103 and identifies from the received signal that the processing is for using Suica® to charge for the train ride. Then, the transaction processing part 162 transmits an identification number of this flip-open type mobile phone 1, the validity data, the sum of money which can be charged, etc. stored in advance in the memory 109 from the transaction antenna 123 as electromagnetic waves to the reader/writer 200 via the transaction communication portion 103.

The reader/writer 200 checks the identification number, validity data, sum of money which can be charged, etc. which are transmitted from the flip-open type mobile phone 1 and issues an authorization signal, a starting fare, etc. as electromagnetic waves when the flip-open type mobile phone 1 is valid and usable.

The transaction processing part 162 of the flip-open type mobile phone 1 receives the authorization signal and starting fare via the transaction antenna 123, then stores the authorization signal and starting fare in the memory 109 together with the data indicating Suica® explained above, the data indicating the name of the train line, and the data indicating the name of the entering (getting-on) station. Further, the transaction processing part 162 transmits a confirmation signal indicating that the above processing ends via the transaction communication portion 103 and the transaction antenna 123 to the reader/writer 200.

The reader/writer 200 receives the confirmation signal from the flip-open type mobile phone 1, then outputs a signal enabling opening of the ticket gate of the automatic fare charging machine to a not shown fare charging processing system. As a result, the ticket gate opens.

By the opening of the ticket gate, the user understand that the use of the flip-open type mobile phone 1 is authorized. The user then removes the transaction antenna 123 of the flip-open type mobile phone 1 from the access window of the reader/writer 200 provided in the automatic fare charging machine.

When the user arrives at the getting-off (exiting) station, the user performs an operation the same as that described above. Note, at that time, the getting-off processing is carried out.

A reader/writers 200 is built in the automatic fare charging machine disposed at the ticket gate of the getting-off station as well. Electromagnetic waves emitted from the reader/writer 200 are emitted from the access window.

The electromagnetic waves emitted from the reader/writer 200 at the getting-off station include, for example, data indicating that Suica® will be used for paying for the train fare, data indicating the name of the train line, and the data indicating the name of the getting-off station where that ticket gate exists.

The transaction processing part 162 inputs the received signal from the reader/writer 200 received via the transaction antenna 123 and the transaction communication portion 103, and identifies from the signal that the processing is for using Suica® to pay the train fare. Then, the transaction processing part 162 transmits the identification number of this flip-open type mobile phone 1, validity data, and the sum of chargeable money stored in advance in the memory 109 and the data indicating the name of the train line, data indicating the name of the getting-off station, authorization signal, and the starting fare stored in the memory 109 by the above processing at the entering station via the transaction communication portion 103 and transaction antenna 123 to the reader/writer 200 of the getting-off station.

The reader/writer 200 of the getting-off station receives the data and signal described above from the flip-open type mobile phone 1, then computes the fare from the getting-on station to the getting-off station and emits this result as electromagnetic waves to the flip-open type mobile phone 1.

The transaction processing part 162 of the flip-open type mobile phone 1 receives the above transmission data from the reader/writer 200, performs the charge processing for the received fare, and stores the date of utilization, train line name, getting-on station, getting-off station, and fare in the memory 109.

After that, the transaction processing part 162 transmits a signal of the end of the charge processing to the reader/writer 200.

The reader/writer 200 built in the automatic fare charging machine of the ticket gate of the getting-off station receives the signal of the end of the charge processing then outputs a signal enabling the opening of that ticket gate to a not shown fare charging processing system. As a result, the ticket gate opens.

By the opening of the ticket gate, the user of the flip-open type mobile phone 1 removes the transaction antenna 123 of the flip-open type mobile phone 1 from close to the access window of the reader/writer 200 of the automatic fare charging machine.

Bearing Processing Restriction

The bearing processing restriction part 158 performs the bearing processing and the transaction processing as non-contact communication processing when the two are not simultaneously requested.

However, the bearing processing restriction part 158 restricts the bearing processing during the transaction processing when the bearing processing and the transaction processing are simultaneously requested.

Details of this will be explained below with reference to FIG. 4 and FIG. 5.

First Example of Bearing Processing Restriction

Figure 4:
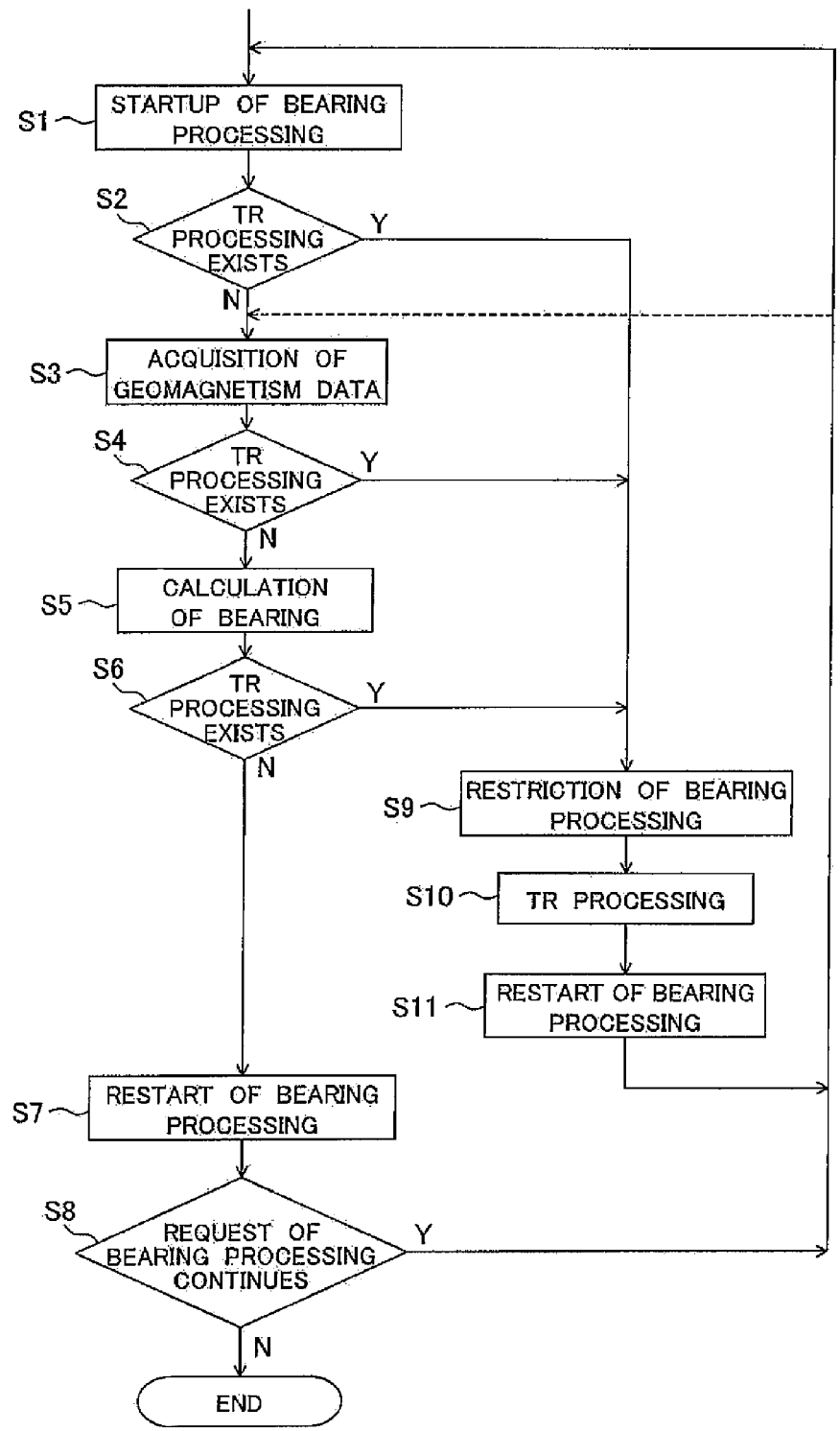
FIG. 4 is a flow chart showing first processing of the signal processing part in the flip-open type mobile phone illustrated in FIG. 1.

FIG. 4 is a flow chart showing a first example of the bearing processing restriction.

The processing of the flip-open type mobile phone 1 in the case where the bearing processing and the transaction processing are going to be simultaneously carried out will be explained with reference to the flow chart of FIG. 4.

Note that, in the following description, a case where the processing part in the signal processor 150 is controlled by the general processing part 152 is exemplified. An example of controlling the operation so that when each processing part ends its processing, this is notified to the general processing part 152, and the general processing part 152 starts up the next processing part for operation, will be explained. However, for example, a method of directly starting up the bearing information announcing part 156 to operate next when the bearing calculation part 154 ends the operation may be employed as well.

Step 1: Startup of Bearing Processing

When bearing processing is requested by the user by the operation of the key input portion 10, the general processing part 152 judges that request and starts up the bearing calculation part 154.

Steps 2, 4, and 6: Judgment of Transaction Processing

Steps 2, 4, and 6 show the processing for judging any transaction processing during the bearing processing. These processings will be explained later.

Bearing Processing in Case of No Transaction Processing

When there is no transaction processing during the bearing processing at steps 2, 4, and 6, the following bearing processing is performed.

Step 3: Acquisition of Geomagnetism Data

The started up bearing calculation part 154 acquires the geomagnetism data detected at the geomagnetism sensor 170. When finishing acquiring the geomagnetism data, the bearing calculation part 154 notifies this signal to the general processing part 152.

Step 5: Processing for Calculation of Bearing

The general processing part 152 instructs continuation of the processing to the bearing calculation part 154, then the bearing calculation part 154 calculates the bearing of the flip-open type mobile phone 1 by using the geomagnetism data acquired at step S3. When finishing the processing for calculation of the bearing, the bearing calculation part 154 notifies this signal to the general processing part 152.

Step 7: Announcement of Bearing Information

The general processing part 152 starts up the bearing information announcing part 156. The started up bearing information announcing part 156 displays the bearing information calculated at step S5 at the display 12 and announces the bearing information. As a result, the display 12, as exemplified in FIG. 1A, for example, displays a symbol indicating the bearing of north.

When finishing the announcement of the bearing information, the bearing information announcing part 156 notifies this signal to the general processing part 152.

Step 8: Judgment of Continued Processing

After a predetermined time passes after the announcement of the bearing information, the general processing part 152 starts up the bearing calculation part 154.

Below, until the end of the bearing processing is instructed, the processing of steps 3, 5, and 7 is periodically repeated for a predetermined time whereby the bearing of the flip-open type mobile phone 1 is continuously updated at the display 12.

Processing in Case of Transaction Processing

During the bearing processing explained above, if the transaction processing part 162 operates due to the transaction antenna 123 of the flip-open type mobile phone 1 being brought close to the reader/writer 200 for transaction processing in any of steps 2, 4, and 6, the general processing part 152 starts up the transaction processing part 162 and starts up the bearing processing restriction part 158.

Step 9: Bearing Processing Restriction

The general processing part 152 performs the following processing for restricting the bearing processing in cooperation with the bearing processing restriction part 158.

(1) Suspends operations of the bearing calculation part 154 and the bearing information announcing part 156. As a result, suspends the bearing processing.

(2) Performs processing showing restriction of the bearing processing. Examples of this will be exemplified below.

a. Erases the display of the bearing information of the display 12. By erasure of the bearing information from the display, the user learns that there is a possibility that the bearing information is not correct.

b. Makes the bearing information displayed at the display 12 at present blink. Alternatively, displays the bearing information displayed at the display 12 at present by red or another color drawing attention. In this case as well, the user learns of the possibility that the bearing information is not correct.

c. Outputs audio indicating that the bearing processing is restricted, for example, a high pitch beep, from the audio processing portion 104 and speaker 105 for a short time. The user learns that the bearing processing is restricted even without looking at the display 12.

d. Combines the audio warning of c and either of the processings of a and b.

Step 10: Transaction Processing

The transaction processing part 162 performs the transaction processing with the reader/writer 200, for example, performs the transaction processing exemplified above with the reader/writer 200 of Suica®.

When finishing the processing ends, the transaction processing part 162 notifies the end of the processing to the general processing part 152.

Step 11: Restart of Bearing Processing

The general processing part 152 and the bearing processing restriction part 158 perform the following processing in cooperation.

(1) The bearing processing restriction part 158 makes the display 12 display the following message.

"Transaction processing ends, electronic compass processing restarts"

(2) The general processing part 152 returns to the processing of step 1 or step 3 instructed by the broken line and starts up the bearing calculation part 154. Due to this, the bearing processing of steps 3, 5, and 7 is restarted.

From the above, during the transaction processing, the bearing processing is restricted, so erroneous bearing information is no longer announced to the user. Further, the user can learn that the bearing processing is restricted.

The transaction processing is usually carried out over several seconds to tens of seconds. When the transaction processing ends, the bearing processing can be restarted, therefore there is no trouble to the user such as restart by using the key input portion 10.

Second Example of Bearing Processing Restriction

Figure 5:
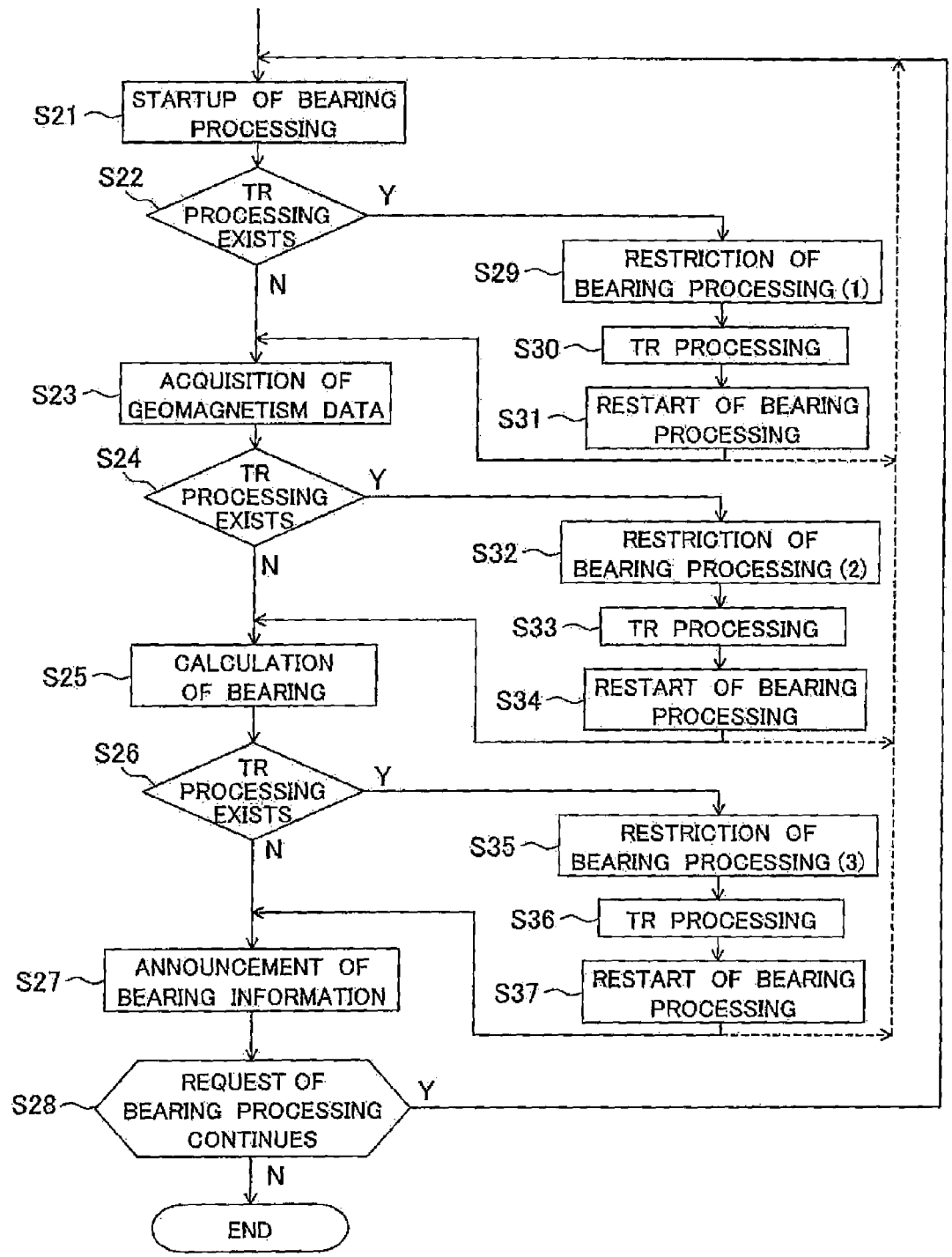
FIG. 5 is a flow chart showing second processing of the signal processing part in the flip-open type mobile phone illustrated in FIG. 1.

FIG. 5 is a flow chart showing a second example of the bearing processing restriction.

For the processing explained with reference to FIG. 4, the case of straight restart from an initial state of the bearing processing when the transaction processing ended after the bearing processing restriction was explained. However, in the processing illustrated in FIG. 5, the way the bearing processing is suppressed differs depending on the transaction processing in accordance with each stage of the bearing processing.

The processing of steps 21 to 31 is basically the same as the processing at steps 1 to 11 of FIG. 4. However, the bearing processing is restricted in accordance with the stage of the bearing processing, so "status data" is used so that the stage (status) can be grasped.

Step 21: Startup of Bearing Processing

When bearing processing is requested by the user by operation of the key input portion 10, the general processing part 152 judges that request and sets a flag indicating the request of the bearing processing in the status data stored in the memory 109.

The general processing part 152 then sets, in the status data, a flag indicating the acquisition of the geomagnetism data from the geomagnetism sensor 170 by the startup of the bearing calculation part 154 and starts up the bearing calculation part 154.

Steps 22, 24, and 26: Judgment of Transaction Processing

Steps 22, 24, and 26 show the processing for judging any transaction processing during the bearing processing. These processings will be explained later.

Bearing Processing in Case of No Transaction Processing

When there is no transaction processing during the bearing processing at steps 22, 24, and 26, the following bearing processing is conducted.

Step 23: Acquisition of Geomagnetism Data

The started up bearing calculation part 154 acquires the geomagnetism data detected at the geomagnetism sensor 170 and notifies the acquisition of the geomagnetism data to the general processing part 152. Therefore, the general processing part 152 resets the flag indicating the acquisition of the geomagnetism data of the status data, sets a flag indicating the start of the calculation of the bearing in the status data next, and restarts the bearing calculation part 154.

Step 25: Calculation of Bearing

The restarted bearing calculation part 154 calculates the bearing of the flip-open type mobile phone 1 by using the acquired geomagnetism data and notifies the end of the calculation to the general processing part 152. The informed general processing part 152 resets the flag indicating the start of the calculation of the bearing in the status data, sets a flag indicating the announcement of the bearing information, and starts up the bearing information announcing part 156.

Step 27: Announcement of Bearing Information

The started up bearing information announcing part 156 displays the calculated bearing information at the display 12. As a result, the display 12, as exemplified in FIG. 1A, for example, displays a symbol pointing out the bearing of north. The bearing information announcing part 156, after the processing, notifies that the bearing announcement ends to the general processing part 152. The informed general processing part 152 resets the flag indicating the announcement of the bearing information in the status data and sets the flag indicating the acquisition of the geomagnetism data in the status data again at step 21 after an elapse of the predetermined time so that the bearing calculation part 154 is restarted.

Step 28: Judgment of Continuation of Bearing Processing

The general processing part 152 starts up the bearing calculation part 154 after the predetermined time passes when the flag indicating the acquisition of the geomagnetism data is set in the status data.

Below, the processing of steps 23, 25, and 27 is periodically repeated every predetermined time, whereby the bearing of the flip-open type mobile phone 1 is continuously updated at the display 12.

Processing in Case of Transaction Processing

During the bearing processing explained above, if the flip-open type mobile phone 1 is brought close to the reader/writer 200 for the transaction processing at any of steps 22, 24, and 26, the bearing announcement suppressing part 158 performs the processing explained below.

In the memory 109, the above status data is stored in the memory 109 by the general processing part 152.

The general processing part 152 can grasp the processing state of the flip-open type mobile phone 1 from the status data.

Below, the processing in cases where the transaction processing occurs at each stage (step) of the bearing processing will be explained.

Steps 22 and 29 to 31: Bearing Processing Restriction (1)

At step 22, when the general processing part 152 detects that the transaction processing part 162 is started up by electromagnetic waves from the reader/writer 200, the general processor part starts up the bearing processing restriction part 158.

The bearing processing restriction part 158 performs processing restricting the bearing processing shown below in cooperation with the general processing part 152.

At step 29, the bearing processing restriction part 158 reads the status data explained above and judges to which stage the bearing processing had advanced to. At the stage of step 29, it is seen that the flag indicating that the bearing calculation part 154 is to acquire the geomagnetism data from the geomagnetism sensor 170 is set and the bearing calculation part 154 has been started up, but the bearing calculation part has not acquired the geomagnetism data from the geomagnetism sensor 170.

Therefore, the bearing processing restriction part 158, as the suppression (1) of bearing processing, temporarily suspends the operation of the bearing calculation part 154. Accordingly, the bearing calculation part 154 does not acquire the geomagnetism data from the geomagnetism sensor 170.

As the restriction (1) of the bearing processing by the bearing processing restriction part 158 in the case where the geomagnetism data has not yet been acquired and the bearing information is not displayed at the display 12 by the bearing information announcing part 156, it is possible to erase all displays concerning the bearing of the display 12 and display at the display 12 that the bearing processing is on standby and transaction processing is being carried out. For example, the bearing processing restriction part 158 displays the following message at the display 12.

"In middle of transaction processing. Electronic compass processing temporarily suspended."

Preferably, during the transaction processing, the bearing processing restriction part 158 can output audio indicating that the bearing processing is restricted, for example, a high pitched beep sound, for s short time from the audio processing portion 104 and speaker 105.

At step 30, the transaction processing part 162 performs the transaction processing with the reader/writer 200, for example, performs the transaction processing exemplified above with the reader/writer 200 of Suica®.

At step 31, when the transaction processing between the transaction processing part 162 and the reader/writer 200 ends, the transaction processing part 162 notifies the end of the processing to the general processing part 152.

The general processing part 152 and the bearing processing restriction part 158 perform the following processing in cooperation.

(1) The bearing processing restriction part 158 makes the display 12 display the following message.

"Transaction processing ended, electronic compass processing restarts."

(2) The general processing part 152 resets a temporary suppression flag of the bearing calculation part 154 set in the status data, sets the flag indicating the acquisition of the geomagnetism data from the geomagnetism sensor 170 by the startup of the bearing calculation part 154 in the status data, returns to step 23, and starts up the bearing calculation part 154. Due to this, the bearing processing at steps 23, 25, and 27 is carried out.

Note that the general processing part 152 may return to step 21 and start the bearing processing from the start as well.

Steps 24 and 32 to 34: Bearing Processing Restriction (2)

At step 23, the general processing part 152 acquired the geomagnetism data from the geomagnetism sensor 170 from the status data at the bearing calculation part 154. At step 24, the processor part detects if the transaction processing part 162 was started up by electromagnetic waves from the reader/writer 200 before the bearing calculation processing. If so, it starts up the bearing processing restriction part 158.

The bearing processing restriction part 158 restricts the bearing processing shown below in cooperation with the general processing part 152.

At step 32, the bearing processing restriction part 158 reads the status data explained above from the memory 109 and judges to which stage the bearing processing has advanced. At the stage of step 32, it is seen that the bearing calculation part 154 has acquired the data from the geomagnetism sensor 170, but it is before the calculation of the bearing.

The bearing processing restriction part 158, as the restriction (2) of the bearing processing, discards the geomagnetism data acquired from the geomagnetism sensor 170 at the bearing calculation part 154. The reason for that resides in the possibility that the geomagnetism data detected by the geomagnetism sensor 170 is not correct due to the influence of the electromagnetic waves of the reader/writer 200.

Then, the bearing processing restriction part 158 fixes the bearing information of the display 12. For fixing the bearing information, for example, the restriction part continues the display of the bearing information based on the geomagnetism data which was acquired the previous time and thereby fixes the graphic of the arrow indicating the bearing as it is or turns the figure of the arrow indicating the bearing to true north. The bearing processing restriction part 158 may make the bearing information announcing part 156 perform this processing as well.

Alternatively, the bearing processing restriction part 158 erases all displays concerning the bearing of the display 12 and displays at the display 12 that the bearing processing is on standby and transaction processing is being carried out. For example, in the same way as the message of step 29, the following message is displayed at the display 12. The bearing processing restriction part 158 may make the bearing information announcing part 156 perform this processing as well.

"In middle of transaction processing. Electronic compass processing temporarily suspended."

At step 33, the transaction processing part 162 performs the transaction processing with the reader/writer 200, for example, performs the transaction processing exemplified above with the reader/writer 200 of Suica®.

At step 34, when the transaction processing between the transaction processing part 162 and the reader/writer 200 ends, the transaction processing part 162 notifies the end of the processing to the general processing part 152.

The general processing part 152 and the bearing processing restriction part 158 perform the following processing in cooperation:

(1) The bearing processing restriction part 158 makes the display 12 display the following message.

"Transaction processing ended, electronic compass processing restarts."

(2) The general processing part 152 sets a flag of the bearing calculation in the status data so as to shift to the processing of step 25, starts up the bearing calculation part 154, and returns to the processing of step 25. Due to this, the bearing calculation part 154 calculates the bearing based on the geomagnetism data detected by the geomagnetism sensor 170. In this case, by the restriction (2) of the bearing processing at step 32, the geomagnetism data detected by the geomagnetism sensor 170 is discarded, therefore the processing part calculates the bearing based on the geomagnetism data which was acquired the previous time.

Note that the general processing part 152 may be returned to the processing of step 21 or step 23 as well.

Steps 26 and 35 to 37: Bearing Processing Restriction (3)

At step 25, the general processing part 152 calculated the bearing at the bearing calculation part 154 from the status data. At step 26, it detected if the transaction processing part 162 was started up by electromagnetic waves from the reader/writer 200 before the bearing calculation processing. If so, it starts up the bearing processing restriction part 158.

The bearing processing restriction part 158 restricts the bearing processing shown below in cooperation with the general processing part 152.

At step 35, the bearing processing restriction part 158 reads the status data explained above from the memory 109 and judges to which stage the bearing processing has advanced. At the stage of step 35, the restriction part is learned that the bearing of the flip-open type mobile phone 1 has been calculated, but this was before the display at the display 12.

The bearing processing restriction part 158, as the restriction (3) of the bearing processing, performs the same processing as step 32. Namely, the bearing processing restriction part 158 discards the bearing data, (2) fixes the bearing information of the display 12, (3) erases all displays concerning the bearing of the display 12, and (4) displays that the bearing processing is on standby and the transaction processing is being carried out at the display 12.

Further, the bearing processing restriction part 158 can display the bearing information displayed at the display 12 by red or make the bearing information blink.

Further, the bearing processing restriction part 158, together with the processing to the display 12, may output a high pitch alarm sound, for example, a beep, via the audio processing portion 104 and speaker 105 and alert the user of that.

At step 36, the transaction processing part 162 performs the transaction processing with the reader/writer 200, for example, performs the transaction processing exemplified above with the reader/writer 200 of Suica®.

At step 37, the bearing processing restriction part 158 makes the display 12 display the bearing information calculated at step 25 by the bearing information announcing part 156.

Note that there also exists a case where the bearing of the flip-open type mobile phone 1 changes during the period where the processing of steps 35 to 37 is carried out. For that, the processing may be restarted from step 27 or the bearing processing may be started from the first by returning to step 21.

As described above, erroneous announcement of the bearing information in the case where the geomagnetism sensor 170 cannot correctly detect the geomagnetism due to electromagnetic waves of the reader/writer 200 during the period where the transaction processing is carried out can be avoided.

Second Embodiment of First Aspect of Present Invention

Figure 6:
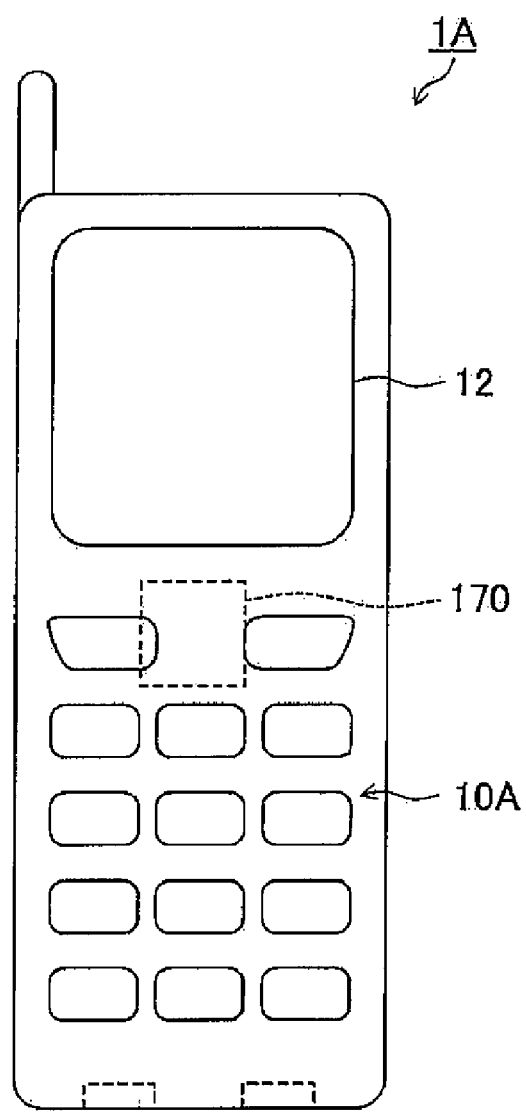
FIG. 6 is a view of the appearance of a straight type mobile phone of an embodiment in the first aspect and second aspect of the present invention.

FIG. 6 is a view of the appearance of a straight type mobile phone 1A in which housings are not opened/closed as a second embodiment of the first aspect of the present invention.

The straight type mobile phone 1A has a key input portion 10A and a display 12A on the outer surface. The geomagnetism sensor 170 and components explained with reference to FIG. 3 are accommodated inside.

Figure 7:
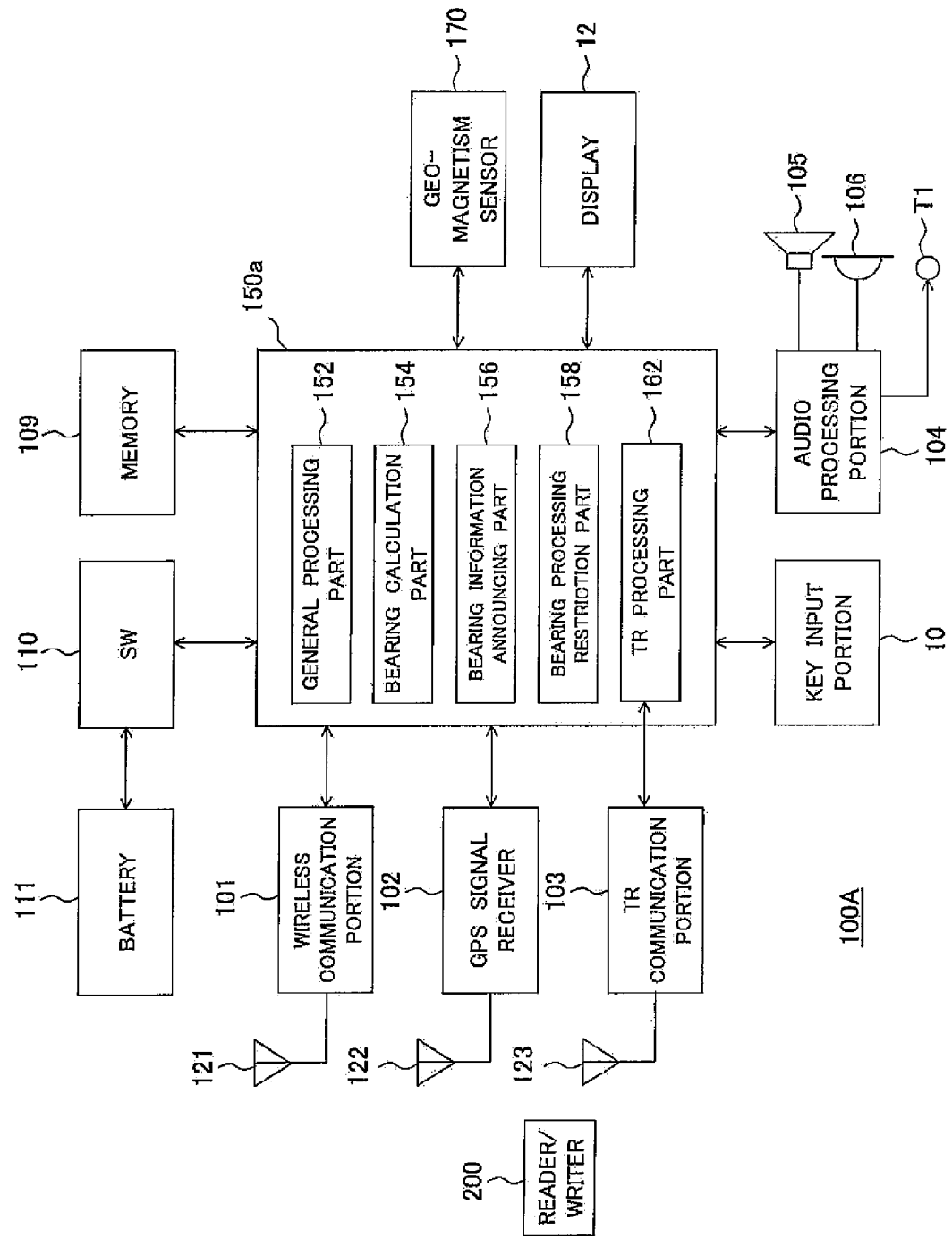
FIG. 7 is a diagram illustrating a portion of the components in a mobile phone which are mounted (arranged) in the straight type mobile phone illustrated in FIG. 6 and mainly showing the signal processing part of the embodiment in the first aspect of the present invention.

Note, in the straight type mobile phone not opening/closing housings, as illustrated in FIG. 7, the magnetic force sensor 180 and magnet 190 are not provided, and the housing open/closed detection processing part 160 is not provided.

Except for the open/closed processing of housings, in the straight type mobile phone 1A illustrated in FIG. 6 as well, the transaction processing and the bearing processing (electronic compass processing) are the same as those of the flip-open type mobile phone 1 of the first embodiment.

The embodiment of the first aspect of the present invention is not limited to the example explained above. Various modifications can be employed.

In the above embodiment, as an example of non-contact communication, communications in various types of transaction processing in the transaction processing of FeliCa, Suica® etc. were explained, but the first aspect of the present invention is not limited to this transaction processing and can be applied to ones performing non-contact communications by using electromagnetic waves in processing other than this.

Further, in the above embodiment, the judgment of any transaction processing (non-contact communication) when executing the bearing processing was performed by detecting that the transaction processing was carried out by bringing the mobile phone 1 (transaction antenna 123) close to the reader/writer 200 for the transaction processing and the operation of the transaction processing part 162, but the invention is not limited to this configuration.

For example, in a case where the apparatus is configured so that a transaction operation switch is disposed on a side surface of the second housing 4 (at a position where it is exposed even in the closed state) on which the transaction antenna 123 is arranged and the transaction processing is started by depressing this transaction use switch, it is possible to detect the depression operation of this transaction switch and restrict the bearing processing by the detection of this depression operation.

Further, in the above embodiment, the explanation was given of a configuration restricting the bearing processing when transaction processing (non-contact communication) was carried out when executing the bearing processing, but the present invention can also be applied to a configuration where the bearing processing is restricted when the bearing processing is executed along with an announcement request of the bearing information when performing the transaction processing (non-contact processing).

For example, the bearing processing as explained above can be carried out, for example, in the case where an operation requesting the display of the bearing information is carried out and the bearing processing is started when the non-contact communication of FeliCa®, Suica®, etc. is being executed, and the display of the bearing information can be prohibited until the execution of the non-contact communication ends.

Embodiment of Second Aspect of Present Invention

A preferred embodiment of the electronic apparatus having the bearing calculation function, announcement function, and non-contact communication function of the second aspect of the present invention and a control method for the same, will be explained.

In the mobile phone of the embodiment of the first aspect of the present invention, the case where the bearing processing was restricted when the bearing processing and the non-contact communication processing were to be simultaneously executed and compete was explained. However, in the flip-open type mobile phone of the embodiment of the second aspect of the present invention, a case where the non-contact communication processing is restricted when the bearing processing and the non-contact communication processing are simultaneously executed and compete will be explained.

A perspective view of the appearance of the mobile phone and a cross-sectional view of the appearance of the portable apparatus of the embodiment of the second aspect of the present invention are illustrated in FIGS. 1A and 1B and FIGS. 2A and 2B in the same way as the perspective view of the appearance of the flip-open type mobile phone and the cross-sectional view of the appearance of the portable apparatus of the embodiment of the second aspect of the present invention.

The appearance, structure, etc. of the flip-open type mobile phone were explained above, therefore an explanation thereof will be omitted.

Note, when explaining the flip-open type mobile phone of the embodiment of the second aspect of the present invention with reference to FIGS. 1A and 1B and FIGS. 2A and 2B, the mobile phone will be described as a flip-open type mobile phone 1B in order to clarify the difference from the flip-open type mobile phone of the embodiment of the first aspect of the present invention.

Figure 8:
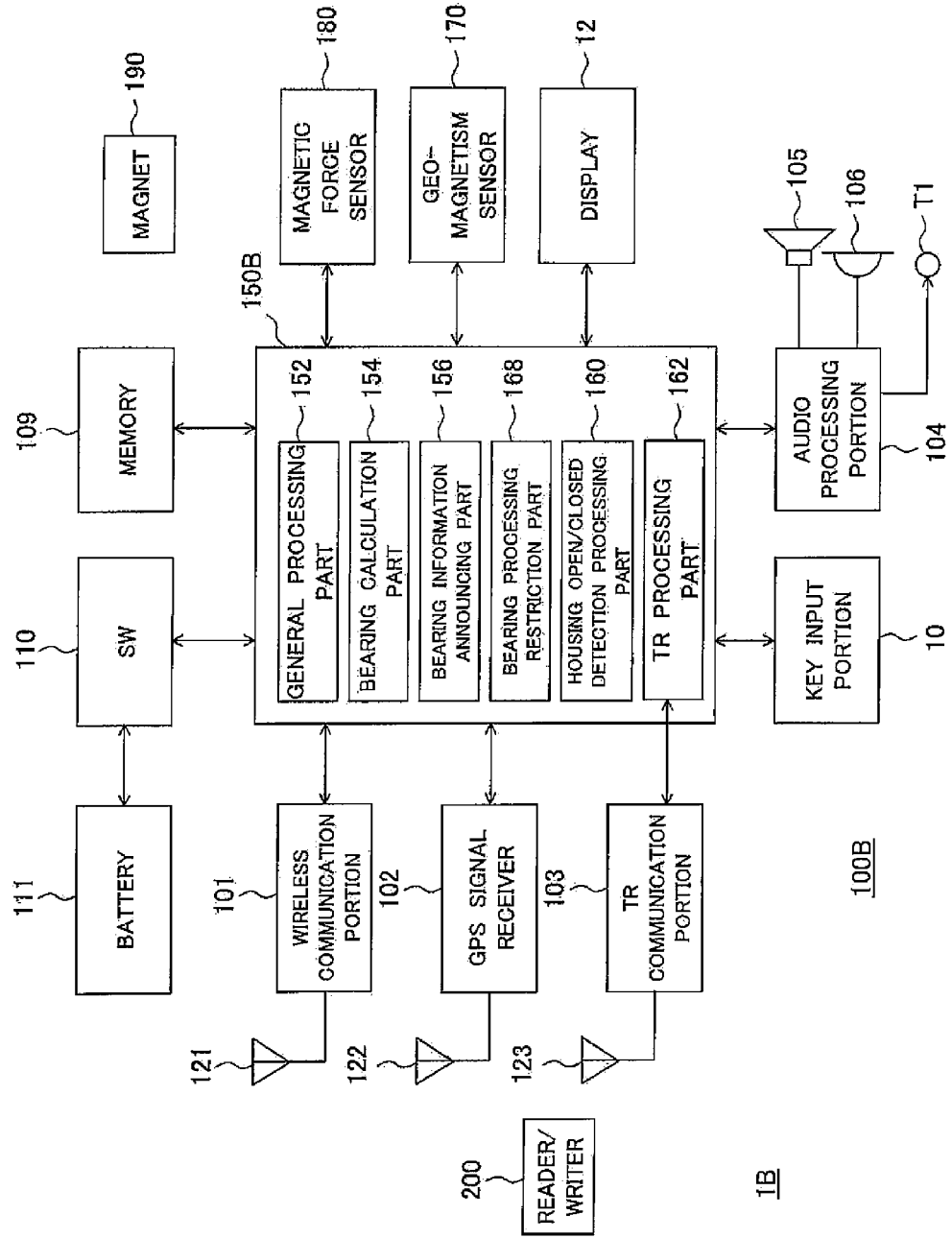
FIG. 8 is a diagram illustrating a portion of the components in a mobile phone of an embodiment of the present invention and mainly showing the signal processing part of the embodiment in the second aspect of the present invention.

Configuration of Signal Processor in Embodiment of Second Aspect of Present Invention FIG. 8 is a diagram illustrating a portion of the components in the flip-open type mobile phone 1B mounted (arranged) in the first housing 3 and second housing 4 and mainly shows a signal processing part 100B.

The signal processor 150B is configured by using, for example, a microprocessor (µP) and has a general processing part 152, a bearing calculation part 154, a bearing information announcing part 156, a transaction (TR) processing restriction part 168 as an example of the non-contact communication restricting means of the present invention, a housing open/closed detection processing part 160, and a TR processing part 162.

The signal processing part 100 in the flip-open type mobile phone 1 of the embodiment of the first aspect of the present invention explained with reference to FIG. 3 and the signal processing part 100B in the flip-open type mobile phone 1B illustrated in FIG. 8 differ in that the signal processor 150B illustrated in FIG. 8 is provided with the transaction (TR) processing restriction part 168 in place of the bearing processing restriction part 158 in the signal processor 150 illustrated in FIG. 3.

The rest of the components are assigned the same notations as those of components in the signal processing part 100 in the flip-open type mobile phone 1 of the embodiment of the first aspect of the present invention and have the same processing functions. Accordingly, an explanation of the components the same as the configuration in the signal processing part 100 explained with reference to FIG. 3 will be omitted.

The outline of the processing content of the signal processor 150B is the same as that explained for the signal processor 150 of the embodiment of the first aspect of the present invention. Accordingly, an explanation of the same processing content will be omitted.

Transaction Processing Restriction

The transaction (TR) processing restriction part 168, an example of the non-contact communication restricting means of the present invention, respectively allows bearing processing executed by one or more of the bearing calculation part 154 and bearing information announcing part 156 and transaction processing by non-contact communication using electromagnetic waves emitted from the reader/writer 200 when these are not executed simultaneously.

However, the TR processing restriction part 168 restricts the transaction processing by non-contact communication during the bearing processing when the bearing processing executed by one or more of the bearing calculation part 154 and the bearing information announcing part 156 and transaction processing by non-contact communication are simultaneously executed.

Note that even if restricting non-contact communication processing when the mobile phone 1B is brought close to the reader/writer 200 for transaction processing by non-contact communication, the user may unintentionally or intentionally position the flip-open type mobile phone 1B in the electromagnetic wave region of the reader/writer 200 for transaction processing by non-contact communication resulting in the geomagnetism sensor 170 detecting erroneous geomagnetism due to the influence of the magnetism caused by electromagnetic waves of the reader/writer 200.

For this reason, preferably, a predetermined countermeasure is taken against the bearing processing executed by either of the bearing calculating means or bearing information announcing means.

Below, details will be explained with reference to FIG. 9 and FIG. 10.

First Example of Transaction (TR) Processing Restriction

Figure 9:
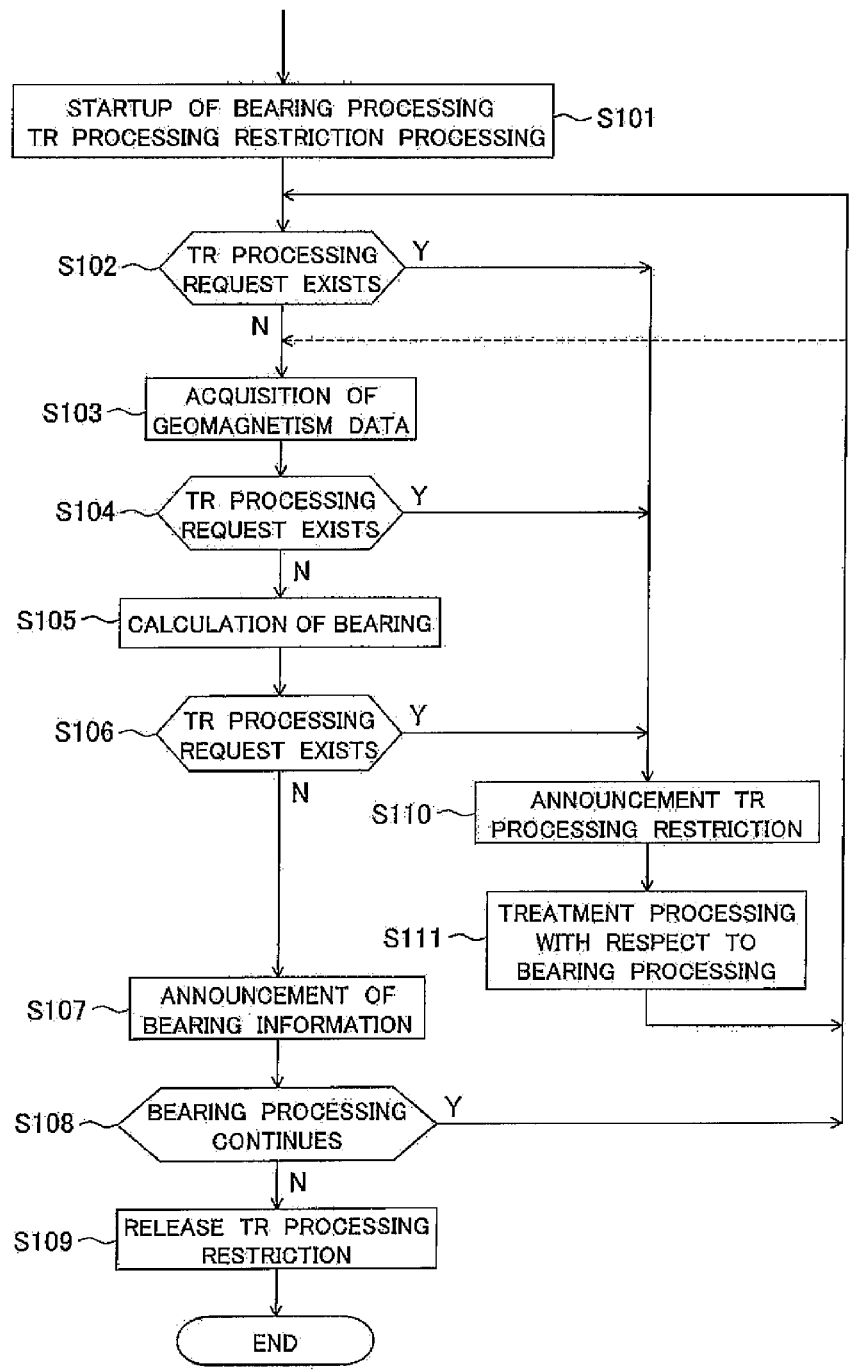
FIG. 9 is a flow chart showing first processing of the signal processing part in the mobile phone illustrated in FIG. 8.

FIG. 9 is a flow chart showing a first example of the restriction method of the transaction (TR) processing.

Referring to the flow chart of FIG. 9, the processing of the mobile phone 1B in the case where bearing processing by one or more of the bearing calculation part 154 and the bearing information announcing part 156 and transaction processing by the non-contact communication are simultaneously executed, will be explained.

In the following description, the case where the processing part in the signal processor 150B is controlled by the general processing part 152 is exemplified. An example of control processing so that, when each processing part ends its processing, this is notified to the general processing part 152, and the general processing part 152 starts up the processing part to operate next will be explained. However, for example, a method of directly starting up the bearing information announcing part 156 to operate next when the operation of the bearing calculation part 154 ends can be employed as well.

Step 101: Startup of Bearing Processing, TR Processing Restriction

When bearing processing by one or more of the bearing calculation part 154 and the bearing information announcing part 156 is requested by the operation of the key input portion 10 by the user, the general processing part 152 judges that request and starts up the bearing calculation part 154. Due to this, the bearing processing starts.

The general processing part 152 further starts up the TR (transaction) processing restriction part 168. The started up TR processing restriction part 168 sets the "TR processing restriction by non-contact communication" so that the TR processing by the non-contact communication is not substantially carried out during the bearing processing period described above. That setting is made so that, for example, the flag indicating the TR processing restriction by non-contact, communication is set to "1" in the status data indicating the operation state of the mobile phone 1B and stored in the memory 109.

From the above, the restriction of the TR processing by the non-contact communication using electromagnetic waves emitted from the reader/writer 200 starts, and the TR processing by non-contact communication is restricted in the bearing processing period.

Note that "transaction processing by non-contact communication is not substantially carried out" means that the operation of the TR communication portion 103 using the TR antenna 123 is not carried out and/or the TR processing part 162 is not operated and the transaction processing is interrupted and the transaction processing operation is no longer conducted even if the TR processing part 162 has been already started up.

Steps 102, 104, and 106: Judgment of Request for Transaction Processing At steps 102, 104, and 106, the general processing part 152 shows processing for judging any request for transaction processing by non-contact communication during the bearing processing in which either of the bearing calculation part 154 or bearing information announcing part 156 is operating.

As explained above, even if restricting the transaction processing by non-contact communication, if the user brings the mobile phone 1B close to, for example, the access window of the reader/writer 200 unintentionally or intending transaction processing by non-contact communication, the TR antenna 123 and the TR communication portion 103 respond to the electromagnetic waves of the reader/writer 200 and it becomes as if the transaction processing were requested. Naturally, by the setting of the transaction processing restriction explained above, the TR processing part 162 does not substantially conduct the original processing. However, when the mobile phone 1B is located in the effective region of electromagnetic waves of the reader/writer 200, sometimes the geomagnetism detected by the geomagnetism sensor 170 is not correct. For this reason, the case where the mobile phone 1B is located in the electromagnetic wave region of the reader/writer 200 even in the bearing processing period in which one of the bearing calculation part 154 or bearing information announcing part 156 is operating will be called a "request for transaction processing by non-contact communication", and the processing explained with reference to steps 110 and 111 is carried out.

Bearing Processing in Case of No Transaction Processing

When there is no request for transaction processing by non-contact communication during the bearing processing at steps 102, 104, and 106, the following bearing processing is conducted.

Step 103: Acquisition of Geomagnetism Data

The bearing calculation part 154 acquires the geomagnetism data detected at the geomagnetism sensor 170. When finishing acquiring the geomagnetism data ends, the bearing calculation part 154 notifies this signal to the general processing part 152.

Step 105: Calculation Processing of Bearing

The general processing part 152 instructs the continuation of the processing to the bearing calculation part 154, whereupon the bearing calculation part 154 calculates the bearing of the mobile phone 1B by using the acquired geomagnetism data. When finishing the calculation processing of the bearing ends, the bearing calculation part 154 notifies this to the general processing part 152.

Step 107: Announcement of Bearing Information

The general processing part 152 starts up the bearing information announcing part 156. The started up bearing information announcing part 156 displays the calculated bearing information at the display 12. As a result, the display 12, as exemplified in FIG. 1A, for example, displays a symbol indicating the bearing of north.

When finishing the announcement of the bearing information, the bearing information announcing part 156 notifies that to the general processing part 152.

Step 108: Judgment of Continued Processing

After the bearing information announcing part 156 announces the bearing information, the general processing part 152 starts up the bearing calculation part 154 after a predetermined time passes.

Below, the processing of steps 103, 105, and 107 is periodically repeated for a predetermined time until the end of the bearing processing by the bearing calculation part 154 and the bearing information announcing part 156 is instructed, whereby the bearing of the mobile phone 1 is continuously updated at the display 12.

Step 109: Release of Transaction Processing Restriction

When the end of the bearing processing by the bearing calculation part 154 and the bearing information announcing part 156 is notified from the general processing part 152, the TR processing restriction part 168 releases the restriction on transaction processing by non-contact communication performed at step 101.

Following this, transaction processing by non-contact communication becomes possible.

Processing in Case of Request for Transaction Processing

During the bearing processing explained above, when the TR antenna 123 of the mobile phone 1A approaches, for example, the access window of the reader/writer 200 in the automatic fare charging machine for transaction processing by the non-contact communication and the TR processing part 162 operates at any of step 102, 104, or 106, the TR processing part 162 restricted in substantial operation by non-contact communication notifies the detection of electromagnetic waves from the reader/writer 200 to the general processing part 152.

Due to this, the general processing part 152 performs the following processing in cooperation with the TR processing restriction part 168 started up together with the startup of the bearing calculation part 154 at step 101 assuming that a request for transaction processing by non-contact communication occurred.

Step 110: Announcement of Bearing Processing Restriction

The TR processing restriction part 168 outputs, via the audio processing portion 104 and speaker 105, an alarm sound indicating that transaction processing by the non-contact communication is restricted and the approach of the mobile phone 1B to the electromagnetic wave region of the reader/writer 200 is restricted, for example, an audible beeping sound. By this audible sound, the user recognizes that moving the mobile phone 1B close to the reader/writer 200 etc. is not preferred.

As a result, the user moves the mobile phone 1B away from the electromagnetic wave region of the reader/writer 200. After this, the user avoids moving the mobile phone 1B close to the reader/writer 200.

Step 111: Treatment with Respect to Bearing Processing

In the case described above, the mobile phone 1B is in fact located, for example, in the electromagnetic wave region of the reader/writer 200 in the automatic fare charging machine, so there is the possibility that the geomagnetism detected by the geomagnetism sensor 170 will not be correct due to this. For this reason, the bearing information being displayed at the display 12 or to be displayed at the display 12 may be incorrect.

In order to show this state of incorrect geomagnetism announcement, the TR processing restriction part 168 performs, for example, one of the following announcement processing:

(1) Makes the bearing information displayed at the display 12 blink to visually warn the user of the mobile phone 1B.

(2) Darkens the bearing information displayed at the display 12 a little (lowers the luminance).

(3) Displays fixed bearing information, for example, bearing information directed to the north, at the display 12.

The user learns that the bearing information is not correct since the bearing information changes as described above in addition to the alarm sound explained above.

In such a situation, the user can perform, for example, calibration for the bearing processing.

For the calibration, for example, the mobile phone 1B is separated from the present position and the bearing processing is restarted.

The general processing part 152 restarts from the processing of step 102 or step 103 after the above processing.

Strong Caution

Note that when the mobile phone 1B is frequently or repeatedly moved close to the electromagnetic wave region of the reader/writer 200, the TR processing restriction part 168 can output a stronger alarm sound than the alarm sound explained above.

Such a "strong alarm sound" means, for example, a large volume beeping sound, a beeping sound having a further higher pitch, or a beeping sound having a large volume and a high pitch.

The term "frequently" is defined in relationship to the bearing processing by the bearing calculation part 154 and the bearing information announcing part 156 and means, for example, a case where the mobile phone 1B is brought close to the electromagnetic wave region of the reader/writer 200 two or more times within 10 minutes. Further, the term "repeatedly" means, for example, a case where the mobile phone 1B repeatedly brought close to the electromagnetic wave region of the reader/writer 200 within 1 minute.

From the above, the transaction processing is restricted in the period of the bearing processing in which one or more the bearing calculation part 154 and the bearing information announcing part 156 is operating.

Forcible Release of Transaction Processing Restriction (1)

When the mobile phone 1B is provided with a "request for transaction processing by non-contact communication" button (not shown) in, for example, the key input portion 10 or on the side surface of the first housing 3 and second housing 4 of the mobile phone 1B and the "request for transaction processing by non-contact communication" button is depressed, irrespective of the bearing processing period in which one of the bearing calculation part 154 or bearing information announcing part 156 is operating, the transaction processing by non-contact communication can be forcibly carried out. In that case, the bearing processing is restricted and the bearing processing is temporarily suspended. When the transaction processing by the non-contact communication ends, the bearing processing by the bearing calculation part 154 and the bearing information announcing part 156 is restarted.

Forcible Release of Transaction Processing Restriction (2)

In the flip-open type mobile phone 1 explained above, when the housing is closed, the key input portion 10 cannot be used, and the display 12 is not seen either. Therefore, usually, the bearing processing by the bearing calculation part 154 and bearing information announcing part 156 is not carried out.

Accordingly, when the housing open/closed detection processing part 160 detects that the first housing 3 and the second housing 4 face each other and the housing is closed, the general processing part 152 does not operate the bearing calculation part 154 and bearing information announcing part 156. Alternatively, when the bearing processing is requested, when the housing open/closed detection processing part 160 detects that the first housing 3 and the second housing 4 face each other and the housing is closed, the bearing processing can be forcibly ended.

In that case, the general processing part 152, for example, forcibly suspends the operation of bearing calculation part 154 and/or bearing information announcing part 156. After that, the general processing part 152 makes the display 12 display, for example, a waiting screen.

In this way, when the user closes the housing of the flip-open type mobile phone 1B in the bearing processing period, the bearing processing is ended (temporarily suspended) and transaction processing by non-contact communication becomes possible. Therefore, in the present embodiment, the transaction processing restriction by the non-contact communication may be forcibly released by closing the housing as well.

Forcible Release of Transaction Processing Restriction (3)

Further, for example, when the user brings the flip-open type mobile phone 1B close to the electromagnetic wave region of the reader/writer 200 in an automatic fare charging machine irrespective of the above strong caution, it is concluded that the user wants to give a higher priority to the transaction processing by non-contact communication than bearing processing. In this case as well, the transaction processing by non-contact communication can be forcibly carried out. In that case, the bearing processing is restricted. In that case, when it is detected that the period in which the flip-open type mobile phone 1B is detecting electromagnetic waves from the reader/writer 200 is a predetermined time or more or the approach distance between the mobile phone 1B and the reader/writer 200 is within a predetermined distance, this processing may be carried out as well.

Second Example of Bearing Processing Restriction

Figure 10:
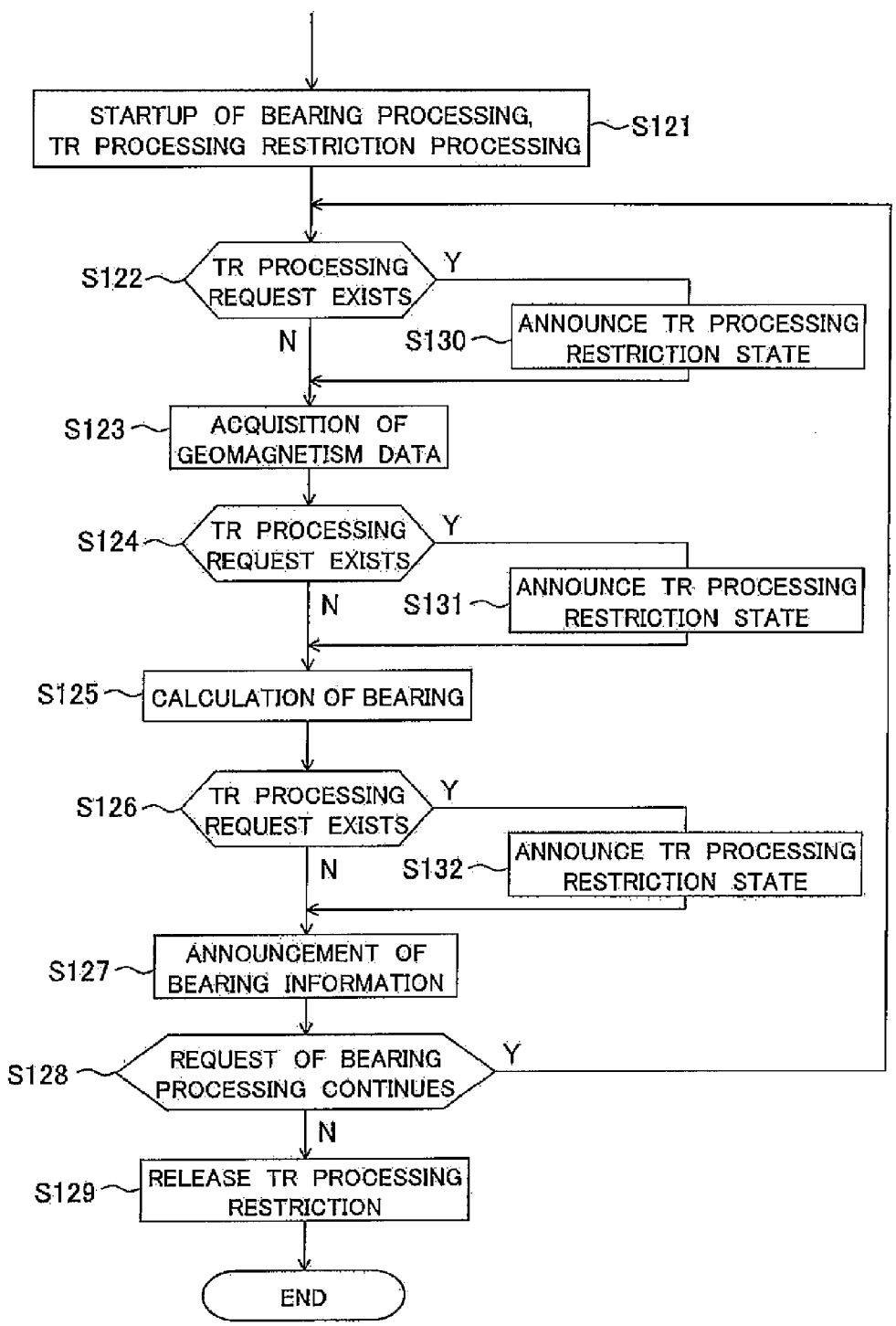
FIG. 10 is a flow chart showing second processing of the signal processing part in the mobile phone illustrated in FIG. 8.

FIG. 10 is a flow chart showing a second example of the bearing processing restriction.

In the processing explained with reference to FIG. 9, the case where the processing of steps 110 and 111 was carried out and the processing from step 103 was restarted when the bearing processing was to be continuously carried out and transaction processing by non-contact communication was requested was explained.

The processing illustrated in FIG. 10 shows an example of processing having a small load on the signal processor 150B in the period of performing the bearing processing in only the case where the bearing processing is requested and/or continuous bearing processing.

The processing of steps 121 to 129 is basically the same as the processing of steps 101 to 109 of FIG. 9.

Step 121: Startup of Bearing Processing

The processing content of step 121 is substantially the same as the processing of step 101 of FIG. 9.

Steps 122, 124, and 126: Judgment of Request for Transaction Processing

The processing contents of steps 122, 124, and 26 are substantially the same as steps 102, 104, and 106 of FIG. 9.

Bearing Processing in Case of No Request for Transaction Processing

When there is no transaction processing by non-contact communication during the bearing processing at steps 122, 124, and 126, the following bearing processing is conducted.

The acquisition of the geomagnetism data at step 123, the calculation of the bearing at step 125, and the processing of announcement of the bearing information at step 127 are the same as the processing of steps 103, 105, and 107 in FIG. 9.

Step 130: Announcement of Transaction Processing Restriction State (1)

At step 122, as explained with reference to FIG. 9, when the TR processing part 162 detects, for example, electromagnetic waves of the reader/writer 200 in the automatic fare charging machine via the TR antenna 123 and the TR communication portion 103, it is provisionally concluded that there is a request for transaction processing. The TR processing part 162 restricted in substantial operation notifies the detection of electromagnetic waves of the reader/writer 200 to the general processing part 152.

Due to this, the general processing part 152 performs the following processing in cooperation with the TR processing restriction part 168 started up at step 121.

The TR processing restriction part 168, for example, performs the following processing in the same way as the processing of step 110 of FIG. 9 in the bearing processing period in order to announce to the user that the restricted transaction processing is requested.

The TR processing restriction part 168 outputs, via the audio processing portion 104 and the speaker 105, an alarm sound indicating that the transaction processing is restricted and bringing the flip-open type mobile phone 1B close to the electromagnetic wave region of the reader/writer 200 or the like has no meaning, for example, an audible sound such as a beep. By this audible sound, the user recognizes that the flip-open type mobile phone 1B preferably should not be brought close to the reader/writer 200 etc.

As a result, the user moves the flip-open type mobile phone 1B away from the electromagnetic wave region of the reader/writer 200. After this the user avoids bringing the flip-open type mobile phone 1B close to the reader/writer 200.

At this point of time, the bearing calculation part 154 has not obtained the geomagnetism data detected at the geomagnetism sensor 170. Accordingly, the bearing information is substantially not influenced by electromagnetic waves, from the reader/writer 200. Therefore, the TR processing restriction part 168 notifies restart of processing from the processing of step 123 to the general processing part 152.

The general processing part 152 starts up the bearing calculation part 154 and instructs the acquisition of the geomagnetism data.

Step 131: Announcement of Transaction Processing Restriction State (2)

When, at step 124, as explained with reference to FIG. 9, the TR processing part 162 detects electromagnetic waves from the reader/writer 200, it is provisionally concluded that there is a request for transaction processing by non-contact communication, and the TR processing part 162 restricted in substantial operation notifies the detection of electromagnetic waves from the reader/writer 200 to the general processing part 152.

Due to this, the general processing part 152 performs the following processing in cooperation with the TR processing restriction part 168 started up at step 121.

The TR processing restriction part 168, in the bearing processing period, for example, performs the same processing as the processing of step 30 to announce that restricted transaction processing by non-contact communication was requested to the user. By that, the alarm sound explained above, for example, the audible beep sound is output.

At this point of time, the bearing calculation part 154 has already obtained the geomagnetism data detected at the geomagnetism sensor 170. Accordingly, there is a good possibility that the obtained geomagnetism data is not influenced by electromagnetic waves from the reader/writer 200. Therefore, the TR processing restriction part 168 notifies restarting of processing from the processing of step 125 to the general processing part 152.

The general processing part 152 starts up the bearing calculation part 154 and instructs it to calculate the bearing from the geomagnetism data detected by the geomagnetism sensor 170.

Step 132: Announcement of Transaction Processing Restriction State (3)

When, at step 126, as explained with reference to FIG. 9, the TR processing part 162 detects electromagnetic waves from the reader/writer 200, it provisionally concludes that there is a request for transaction processing by non-contact communication, and the TR processing part 162 restricted in substantial operation notifies the detection of electromagnetic waves from the reader/writer 200 to the general processing part 152.

Due to this, the general processing part 152 performs the following processing in cooperation with the TR processing restriction part 168 started up at step 121.

The TR processing restriction part 168 performs the same processing as the processing of step 130 in order to announce that restricted transaction processing by non-contact communication was requested to the user in the bearing processing period. By that, the alarm sound explained above, for example, the audible beep sound, is output.

At this point of time, the bearing calculation part 154 has already calculated the bearing based on the geomagnetism data detected by the geomagnetism sensor 170. Accordingly, there is a good possibility that the calculated bearing is not influenced by electromagnetic waves from the reader/writer 200. Therefore, the TR processing restriction part 168 notifies restarting of processing from the processing of step 127 to the general processing part 152.

The general processing part 152 starts up the bearing information announcing part 156 and instructs the announcement of the bearing information.

Step 128: Judgment of Continuation of Bearing Processing

After the bearing announcement at step 127, the general processing part 152 checks whether or not the bearing processing is being continuously carried out and returns to the processing of step 122 or step 123 when the processing continues.

When the bearing processing is not continuously carried out, the TR processing restriction part 168 releases the restriction on transaction processing by non-contact communication. After this, the TR processing part 162 becomes able to perform transaction processing by non-contact communication.

Forcible Release of Transaction Processing Restriction

Forcible release of the (1), (2), and (3) processing of the restriction on transaction processing by non-contact communication explained above can be applied to the present embodiment as well.

Second Embodiment of Second Aspect of Present Invention

Figure 11C:
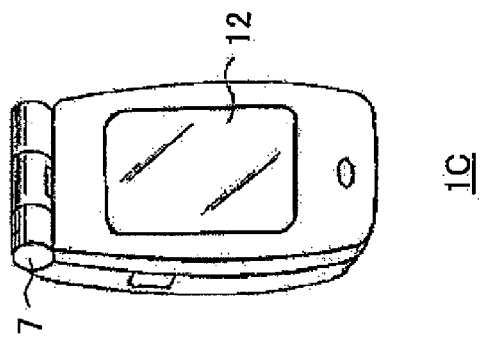
FIGS. 11A to 11C are perspective views of appearances of the mobile phone of the second embodiment of the second aspect of the present invention.
Figure 11B:
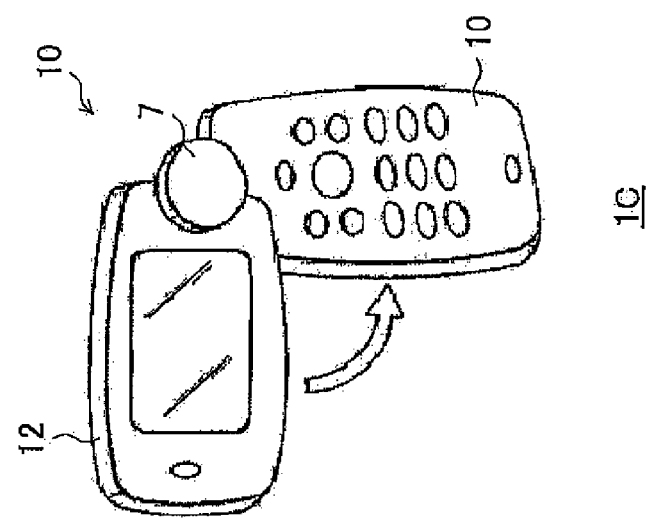
Figure 11A:
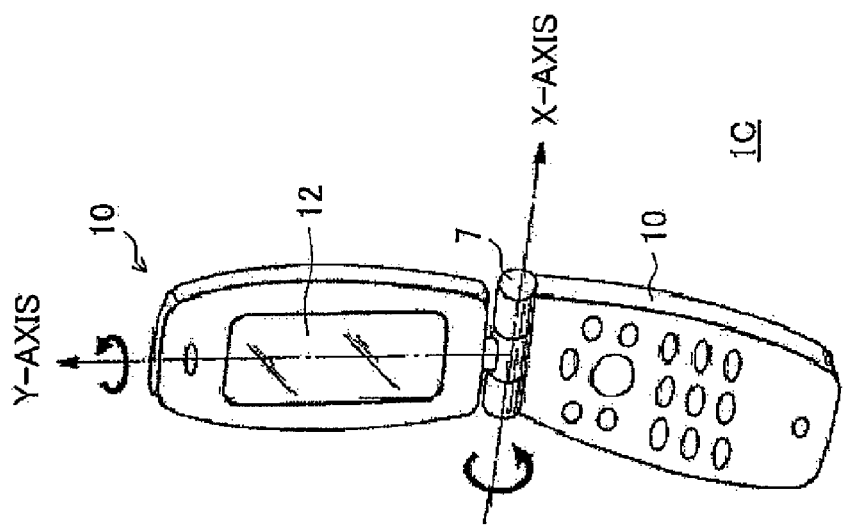

As another form of the flip-open type mobile phone, as exemplified in FIGS. 11A to 11C, a form where the display 12 is rotated even in the case where the first housing 3 and the second housing 4 face each other, and the display content of the display 12 can be seen may be employed as well.

Accordingly, even in the case where the first housing 3 and the second housing 4 face each other, the bearing information can be displayed at the display 12.

In the mobile phone 1C illustrated in FIGS. 11A to 11C, it is judged that not only do the first housing 3 and the second housing 4 face each other, but also whether or not the display 12 can display anything and the processing of the "forcible release of restriction on transaction processing by non-contact communication (2)" explained above is carried out.

The rest of the processing is the same as that of the first embodiment of the second aspect of the present invention.

Third Embodiment of Second Aspect of Present Invention

The straight type mobile phone shown in FIG. 6 shown as the flip-open type mobile phone 1A of the embodiment of the first aspect of the present invention can be applied as a third embodiment of the second aspect of the present invention as well.

Figure 12:
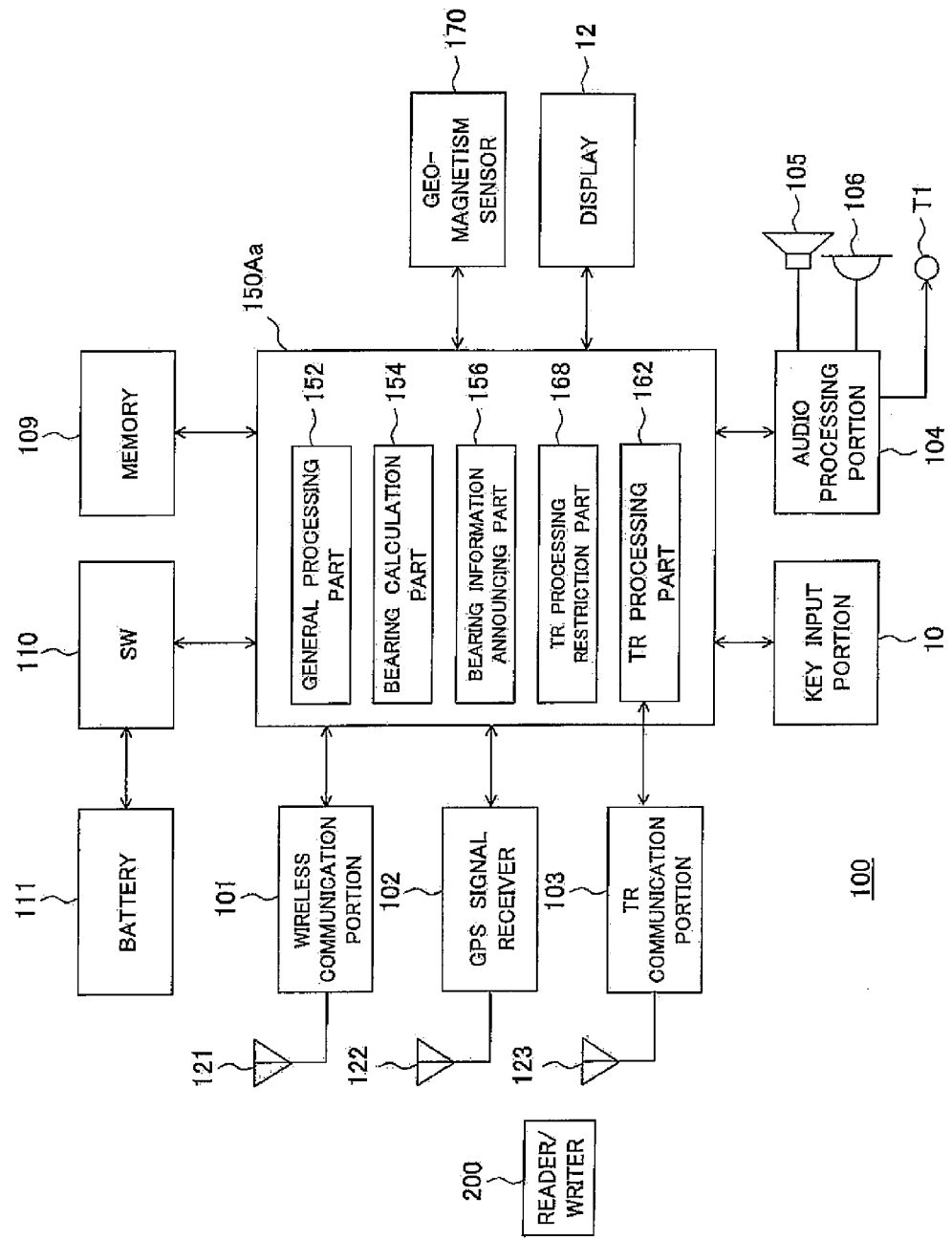
FIG. 12 is a diagram illustrating a portion of the components showing the signal processing part in a mobile phone mounted (arranged) in a straight type mobile phone as a third embodiment of the second aspect of the present invention illustrated in FIG. 6

As illustrated in FIG. 12, the straight type mobile phone 1A not performing opening/closing of the housing is not provided with the magnetic force sensor 180 and the magnet 190 and is not provided with the housing open/closed detection processing part 160 either. The processing of the "forcible release (2) of restriction on transaction processing by non-contact communication" explained above does not correspond to this.

Except for the open/closed detection processing of the housing, in the straight type mobile phone illustrated in FIG. 6 as well, the transaction processing and the bearing processing (electronic compass processing) are the same as those of the flip-open type mobile phone 1B of the first embodiment of the second aspect of the present invention.

The embodiment of the second aspect of the present invention is not limited to the illustration explained above. Various modifications can be employed in the same way as that explained for the embodiment of the first aspect of the present invention.

In the embodiments explained above, as the embodiment of the first aspect of the present invention, an explanation was given of the case where either of the restriction of the bearing processing (first aspect) or the restriction of the non-contact communication processing (second aspect) was carried out by the method set in advance when the bearing processing and the non-contact communication processing are simultaneously executed and compete, but it can be carried out by the setting of the user of the flip-open type mobile phone as well. In that case, the user can, for example, select the intended restriction method by the operation of a function key etc. provided in the flip-open type mobile phone.

INDUSTRIAL APPLICABILITY

The electronic apparatus of the present invention is not limited to a mobile phone and can be applied to various other electronic apparatuses detecting geomagnetism by using a geomagnetism sensor and performing non-contact communication using electromagnetic waves. The control method of the present invention can be applied to such electric apparatuses.

The invention claimed is:
1. An electronic apparatus comprising:
a geomagnetism sensor that detects geomagnetism,
a bearing processing part that performs a bearing process including a calculation of a geographical bearing based on the geomagnetism detected by the geomagnetism sensor and an announcement of an information concerning the geographical bearing calculated,
a non-contact communication part that performs non-contact communication using electromagnetic waves, and
a restriction part that restricts either of the non-contact communication by the non-contact communication part or the bearing process by the bearing processing part such that the bearing process is not influenced by the electromagnetic waves used in the non-contact communication, wherein the non-contact communication part is not a wireless communication part that performs wireless communication with a wireless base station.

2. An electronic apparatus as set forth in claim 1, wherein the restriction part restricts the bearing process.

3. An electronic apparatus as set forth in claim 2, wherein the restriction part releases the restriction of the bearing process when the non-contact communication in the non-contact communication part ends.

4. An electronic apparatus as set forth in claim 1, wherein the electronic apparatus further comprises a display, and the bearing processing part, as the bearing process, displays the information concerning the bearing at the display.

5. An electronic apparatus as set forth in claim 4, wherein the restriction part, as the restriction of the bearing process, displays the information concerning the bearing at the display.

6. An electronic apparatus as set forth in claim 4, wherein the restriction part, as the restriction of the bearing process, fixes a display format of the information concerning the bearing at the display.

7. An electronic apparatus as set forth in claim 4, wherein the restriction part, as the restriction of the bearing process, erases the information concerning the bearing at the display.

8. An electronic apparatus as set forth in claim 1, wherein the restriction part restricts the non-contact communication.

9. An electronic apparatus as set forth in claim 8, wherein the electronic apparatus further comprises a display, the bearing processing part, as the bearing process, displays the information concerning the bearing at the display, and the restriction part, when restricting the non-contact communication, announces information indicating that the non-contact communication is restricted by changing the display format of the information concerning the bearing displayed at the display.

10. An electronic apparatus as set forth in claim 8, wherein the restriction part announces information indicating an existence of a possibility that the announcement of the bearing information by the bearing processing part is not correct due to electromagnetic waves.

11. An electronic apparatus as set forth in claim 10, wherein the electronic apparatus further comprises a display, the bearing processing part, as the bearing process, displays the information concerning the bearing at the display, and the restriction part, as the information indicating an existence of the possibility that the announcement of the bearing information by the bearing processing part is not correct due to the electromagnetic waves, changes the display format of the information concerning the bearing displayed at the display.

12. An electronic apparatus as set forth in claim 1, wherein the restriction part announces that either of the non-contact communication or the bearing process has been restricted.

13. An electronic apparatus as set forth in claim 12, wherein the electronic apparatus further comprises an audio output portion, and the restriction part outputs an audio information indicating that either of the non-contact communication or the bearing process was restricted via the audio output portion.

14. An electronic apparatus as set forth in claim 1, wherein the bearing processing part includes a bearing calculation part that calculates a geographical bearing based on a geomagnetism detected by the geomagnetism sensor and a bearing information announcing part that announces an information concerning the bearing calculated by the bearing processing part, and the restriction part restricts either of the non-contact communication by the non-contact communication part or the bearing process by at least one of the bearing calculation part and the bearing information announcing part in a case where the non-contact communication and the bearing process are simultaneously executed.

15. A control method of an electronic apparatus comprising:

a bearing processing step of performing a bearing process including a calculation of a geographical bearing based on a geomagnetism detected by a geomagnetism an announcement of an information concerning the calculated bearing, a non-contact communication step of performing non-contact communication using electromagnetic waves, which is not a communication with a wireless base station, and a restriction step of restricting either of the non-contact communication or the bearing process such that the bearing process in the bearing processing step is not influenced by the electromagnetic waves used in the non-contact communication.

16. A control method of an electronic apparatus as set forth in claim 15, wherein the restriction step performs a process restricting the bearing process.

17. A control method of an electronic apparatus as set forth in claim 16, wherein the restriction step performs a process releasing the restriction of the bearing process when the non-contact communication ends.

18. A control method of an electronic apparatus as set forth in claim 15, wherein the restriction step performs a process restricting the non-contact communication.

19. A control method of an electronic apparatus as set forth in claim 15, wherein the bearing processing step includes a bearing calculation step of calculating the geographical bearing based on the geomagnetism detected by the geomagnetism sensor and a bearing information announcement step of announcing the information concerning the calculated bearing, and the restriction step restricts either of the non-contact communication or the bearing process in a case where the non-contact communication in the non-contact communication step and the bearing process in at least one of the bearing calculation step and the bearing information announcement step are simultaneously executed.

* * * * *